United States Patent
Badaye

(10) Patent No.: US 8,415,959 B2
(45) Date of Patent: Apr. 9, 2013

(54) SINGLE LAYER TRANSCAPACITIVE SENSING

(75) Inventor: Massoud Badaye, Santa Clara, CA (US)

(73) Assignee: Synaptics Incorporated, Santa Clara, CA (US)

( * ) Notice: Subject to any disclaimer, the term of this patent is extended or adjusted under 35 U.S.C. 154(b) by 299 days.

(21) Appl. No.: 12/847,598

(22) Filed: Jul. 30, 2010

(65) Prior Publication Data

US 2011/0062971 A1    Mar. 17, 2011

Related U.S. Application Data

(60) Provisional application No. 61/241,692, filed on Sep. 11, 2009.

(51) Int. Cl.
*G01R 27/26* (2006.01)
*G06F 3/041* (2006.01)

(52) U.S. Cl.
USPC .......................................... 324/658; 345/173

(58) Field of Classification Search .................. 324/658
See application file for complete search history.

(56) References Cited

U.S. PATENT DOCUMENTS

| | | | |
|---|---|---|---|
| 4,087,625 A * | 5/1978 | Dym et al. | 178/18.06 |
| 5,841,078 A | 11/1998 | Miller et al. | |
| 6,288,707 B1 * | 9/2001 | Philipp | 345/168 |
| 6,297,811 B1 | 10/2001 | Kent et al. | |
| 6,879,930 B2 * | 4/2005 | Sinclair et al. | 702/150 |
| 7,030,860 B1 | 4/2006 | Hsu et al. | |
| 7,265,686 B2 | 9/2007 | Hurst et al. | |
| 7,382,139 B2 * | 6/2008 | Mackey | 324/660 |
| 7,737,953 B2 | 6/2010 | Mackey | |
| 2004/0135775 A1 | 7/2004 | Hurst et al. | |
| 2005/0012644 A1 | 1/2005 | Hurst et al. | |
| 2006/0038791 A1 * | 2/2006 | Mackey | 345/173 |
| 2006/0097991 A1 | 5/2006 | Hotelling et al. | |
| 2007/0146349 A1 | 6/2007 | Errico et al. | |
| 2007/0257894 A1 | 11/2007 | Philipp | |
| 2008/0006453 A1 | 1/2008 | Hotelling | |
| 2008/0246496 A1 | 10/2008 | Hristov et al. | |
| 2009/0194344 A1 | 8/2009 | Harley et al. | |

(Continued)

FOREIGN PATENT DOCUMENTS

EP    2045698    4/2009

OTHER PUBLICATIONS

ISA/KR, International Search Report and Written Opinion for International Application No. PCT/US2010/048319, 11 pages, Apr. 28, 2011.

*Primary Examiner* — Jeff Natalini

(57) ABSTRACT

First, second, and third sets of sensor electrodes are disposed in a single layer on a first surface of a substrate of a transcapacitive sensor device. Sensor electrodes of the first set are substantially parallel to a first axis and are substantially identical to one another. The second set comprises a rotated mirror symmetric version of the first set, disposed parallel to the first axis. The third set is disposed between sensor electrodes of said first set and said second set, and includes a sensor electrode comprising a rectangular shape with a long side aligned paralleling the first axis. The first and third sets of sensor electrodes are configured for providing a first capacitive coupling therebetween that varies substantially along the first axis. The second and third sets are configured for providing a second capacitive coupling therebetween that varies substantially inversely to the first capacitive coupling along the first axis.

16 Claims, 10 Drawing Sheets

U.S. PATENT DOCUMENTS

| | | |
|---|---|---|
| 2009/0267914 A1 | 10/2009 | Dews et al. |
| 2009/0277696 A1 | 11/2009 | Reynolds et al. |
| 2009/0322355 A1 | 12/2009 | Day et al. |
| 2010/0007625 A1 | 1/2010 | Jiang et al. |
| 2010/0045632 A1 | 2/2010 | Yilmaz et al. |
| 2010/0164889 A1 | 7/2010 | Hristov et al. |
| 2010/0258360 A1 | 10/2010 | Yilmaz |
| 2010/0328255 A1 | 12/2010 | Ishizaki et al. |
| 2011/0043478 A1 | 2/2011 | Matsushima |
| 2011/0048813 A1 | 3/2011 | Yilmaz |

* cited by examiner

600

ACQUIRE A FIRST TRANSCAPACITIVE MEASUREMENT BY EMITTING A FIRST ELECTRICAL SIGNAL WITH A FIRST SET OF TRANSMITTER SENSOR ELECTRODES AND RECEIVING THE FIRST ELECTRICAL SIGNAL WITH AT LEAST ONE RECEIVER SENSOR ELECTRODE OF A SET OF RECEIVER SENSOR ELECTRODES, WHEREIN THE FIRST SET OF TRANSMITTER SENSOR ELECTRODES AND THE SET OF RECEIVER SENSOR ELECTRODES ARE CONFIGURED FOR PROVIDING A FIRST CAPACITIVE COUPLING THEREBETWEEN THAT VARIES SUBSTANTIALLY ALONG A FIRST AXIS.
610

ACQUIRE A SECOND TRANSCAPACITIVE MEASUREMENT BY EMITTING A SECOND ELECTRICAL SIGNAL WITH A SECOND SET OF TRANSMITTER SENSOR ELECTRODES AND RECEIVING THE SECOND ELECTRICAL SIGNAL WITH THE AT LEAST ONE RECEIVER SENSOR ELECTRODE OF THE SET OF RECEIVER SENSOR ELECTRODES, WHEREIN THE SECOND SET OF TRANSMITTER SENSOR ELECTRODES AND THE SET OF RECEIVER SENSOR ELECTRODES ARE CONFIGURED FOR PROVIDING A SECOND CAPACITIVE COUPLING THEREBETWEEN THAT VARIES SUBSTANTIALLY INVERSELY TO THE FIRST CAPACITIVE COUPLING ALONG THE FIRST AXIS, AND WHEREIN THE FIRST SET OF TRANSMITTER SENSOR ELECTRODES, THE SECOND SET OF TRANSMITTER SENSOR ELECTRODES, AND THE SET OF RECEIVER SENSOR ELECTRODES ARE ALL DISPOSED IN A SINGLE LAYER ON A FIRST SURFACE OF A SENSOR SUBSTRATE.
620

DETERMINE POSITIONAL INFORMATION RELATED TO AN EXTERNAL INPUT OBJECT BASED ON THE FIRST TRANSCAPACITIVE MEASUREMENT AND THE SECOND TRANSCAPACITIVE MEASUREMENT, WHEREIN THE POSITIONAL INFORMATION COMPRISES AT LEAST A POSITION OF THE INPUT OBJECT ALONG THE FIRST AXIS.
630

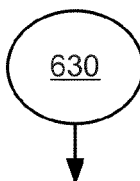

ACQUIRE A THIRD TRANSCAPACITIVE MEASUREMENT BY EMITTING A THIRD ELECTRICAL SIGNAL WITH A THIRD SET OF TRANSMITTER SENSOR ELECTRODES AND RECEIVING THE THIRD ELECTRICAL SIGNAL WITH AT LEAST ONE RECEIVER SENSOR ELECTRODE OF THE SET OF RECEIVER SENSOR ELECTRODES, WHEREIN THE THIRD SET OF TRANSMITTER SENSOR ELECTRODES IS DISPOSED ON THE FIRST SURFACE IN THE SINGLE LAYER AT A LATERALLY SHIFTED LOCATION ALONG THE FIRST AXIS FROM THE FIRST SET OF TRANSMITTER SENSOR ELECTRODES, AND WHEREIN THE THIRD SET OF TRANSMITTER SENSOR ELECTRODES COMPRISES A MIRROR SYMMETRIC COPY OF THE FIRST SET OF TRANSMITTER SENSOR ELECTRODES.
640

ACQUIRE A FOURTH TRANSCAPACITIVE MEASUREMENT BY EMITTING A FOURTH ELECTRICAL SIGNAL WITH A FOURTH SET OF TRANSMITTER SENSOR ELECTRODES AND RECEIVING THE FOURTH ELECTRICAL SIGNAL WITH AT LEAST ONE RECEIVER SENSOR ELECTRODE OF THE SET OF RECEIVER SENSOR ELECTRODES, WHEREIN THE FOURTH SET OF TRANSMITTER SENSOR ELECTRODES IS DISPOSED ON THE FIRST SURFACE IN THE SINGLE LAYER AT A LATERALLY SHIFTED LOCATION ALONG THE FIRST AXIS FROM THE SECOND SET OF TRANSMITTER SENSOR ELECTRODES, AND WHEREIN THE FOURTH SET OF TRANSMITTER SENSOR ELECTRODES COMPRISES A MIRROR SYMMETRIC COPY OF THE SECOND SET OF TRANSMITTER SENSOR ELECTRODES.
650

FORM A FIRST SET OF SENSOR ELECTRODES ON A FIRST SURFACE OF A SENSOR SUBSTRATE, WHEREIN INDIVIDUAL SENSOR ELECTRODES OF THE FIRST SET OF SENSOR ELECTRODES ARE SUBSTANTIALLY PARALLEL TO A FIRST AXIS, WHEREIN THE INDIVIDUAL SENSOR ELECTRODES OF THE FIRST SET OF SENSOR ELECTRODES ARE SUBSTANTIALLY IDENTICAL TO ONE ANOTHER.
710

↓

FORM A SECOND SET OF SENSOR ELECTRODES ON THE FIRST SURFACE, THE SECOND SET OF SENSOR ELECTRODES FORMED IN A SINGLE LAYER WITH THE FIRST SET OF SENSOR ELECTRODES, THE SECOND SET OF SENSOR ELECTRODES COMPRISING A ROTATED MIRROR SYMMETRIC VERSION OF THE FIRST SET OF SENSOR ELECTRODES, AND THE SECOND SET OF SENSOR ELECTRODES FORMED PARALLEL TO THE FIRST AXIS.
720

↓

FORM A THIRD SET OF SENSOR ELECTRODES IN THE SINGLE LAYER ON THE FIRST SURFACE IN AN INTERLEAVED FASHION BETWEEN SENSOR ELECTRODES OF THE FIRST AND SECOND SETS OF SENSOR ELECTRODES, WHEREIN ANY THIRD SENSOR ELECTRODE COMPRISES A RECTANGULAR SHAPE WITH A LONG SIDE ALIGNED PARALLEL TO THE FIRST AXIS.
730

↓

FORM A FIRST COMMON ROUTING TRACE FOR COUPLING A PLURALITY OF THE FIRST SET OF SENSOR ELECTRODES TO A PROCESSING SYSTEM.
740

↓

FORM A SECOND COMMON ROUTING TRACE FOR COUPLING A PLURALITY OF THE SECOND SET OF SENSOR ELECTRODES TO THE PROCESSING SYSTEM.
750

FIG. 7A

# SINGLE LAYER TRANSCAPACITIVE SENSING

RELATED U.S. APPLICATION (PROVISIONAL)

This application claims priority to the provisional patent application Ser. No. 61/241,692, entitled "SINGLE LAYER CAPACITANCE IMAGING SENSOR," with filing date Sep. 11, 2009, and assigned to the assignee of the present invention, which is herein incorporated by reference in its entirety.

BACKGROUND

Transcapacitive sensing is a key technology in the implementation of sophisticated modern human-machine interfaces. Transcapacitive sensing can involve sensing the proximity, contact, and/or position of an input object such as, for example, a human digit (finger, thumb, toe), stylus, or writing utensil, among others. Typically, transcapacitive sensor devices (and systems in which they are utilized) are based on measures of mutual capacitance, which is also known as transcapacitance. In some implementations, the transcapacitive measurements can be used to capture/create a transcapacitive image relative to an input interface of a sensor in the transcapacitive sensor device.

BRIEF DESCRIPTION OF THE DRAWINGS

The accompanying drawings, which are incorporated in and form a part of the Description of Embodiments, illustrate various embodiments of the present invention and, together with the Description of Embodiments, serve to explain principles discussed below. The drawings referred to in this Brief Description of Drawings should not be understood as being drawn to scale unless specifically noted.

FIGS. 6A and 6B illustrate a flow diagram of an example method of capacitive sensing in a transcapacitive sensing device, according to various embodiments.

FIGS. 7A and 7B illustrate a flow diagram of an example method of creating a transcapacitive sensor, according to various embodiments.

DESCRIPTION OF EMBODIMENTS

Reference will now be made in detail to various embodiments of the subject matter, examples of which are illustrated in the accompanying drawings. While various embodiments are discussed herein, it will be understood that they are not intended to limit to these embodiments. On the contrary, the presented embodiments are intended to cover alternatives, modifications and equivalents, which may be included within the spirit and scope of the various embodiments. Furthermore, in this Description of Embodiments, numerous specific details are set forth in order to provide a thorough understanding of embodiments of the present subject matter. However, embodiments may be practiced without these specific details. In other instances, well known methods, procedures, components, and circuits have not been described in detail as not to unnecessarily obscure aspects of the described embodiments.

Overview of Discussion

The discussion will begin with description of an example transcapacitive sensor device with which or upon which various embodiments described herein may be implemented. Several non-inclusive example configurations of transcapacitive sensors (and their sensor electrodes arrangements), which can be used with the transcapacitive sensor device, will be described. As will be explained, the transcapacitive sensors described herein are fashioned with transmitter and receiver sensor electrodes that can be disposed upon a substrate in a single common layer with one another. Operation of the transcapacitive sensor device will then be described in more detail in conjunction with description of an example method of capacitive sensing, according to embodiments. Discussion will conclude with a description of a method of creating a transcapacitive sensor, according to one or more embodiments.

Example Transcapacitive Sensor Device

Figure 1:
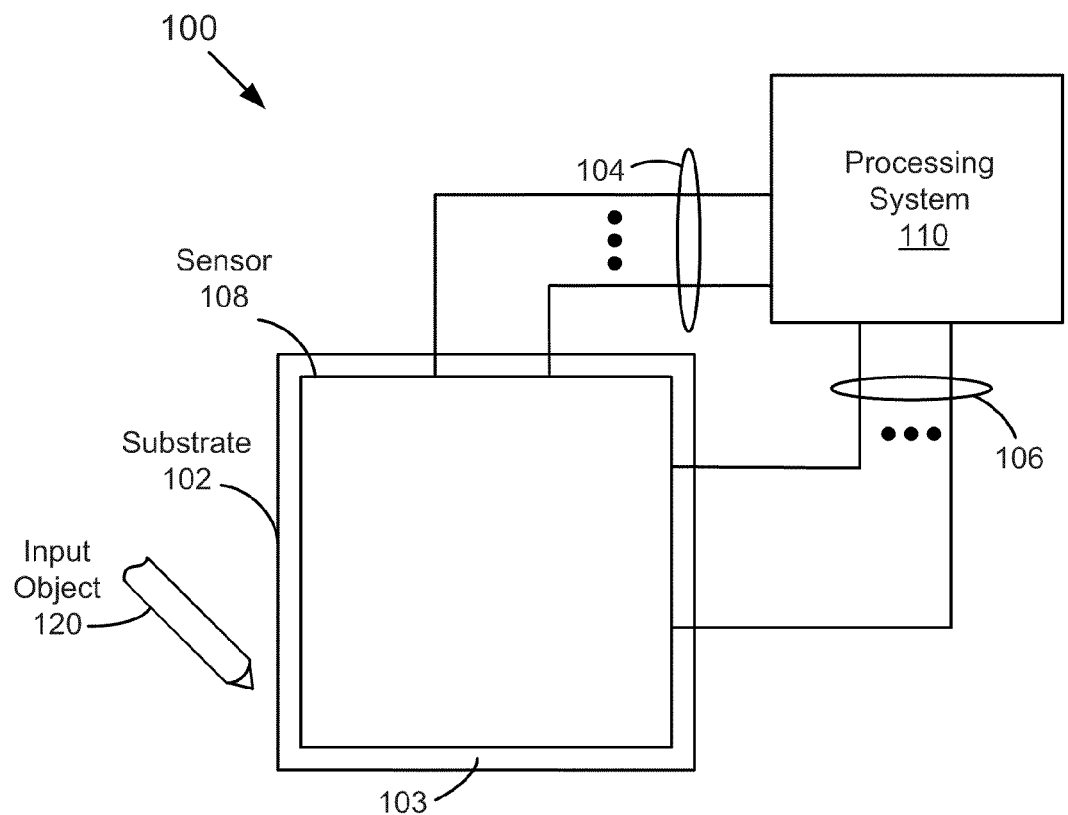
FIG. 1 is a plan view block diagram of an example capacitive sensing device that can be implemented to include one or more embodiments of the invention.

FIG. 1 is a plan view block diagram of an example transcapacitive sensor device 100 that can be implemented to include one or more embodiments of the present invention. Transcapacitive sensor device 100 is a capacitive sensor device and is interchangeably referred to herein as both "transcapacitive sensor device," "sensor device," and "device." In one embodiment, transcapacitive sensor device 100 comprises substrate 102, sensor 108, routing traces 104 and 106, and processing system 110. A first surface 103 of substrate 102 is visible in FIG. 1.

Transcapacitive sensor device 100 can be utilized to communicate user input via an input object 120 (e.g., a user's finger, a probe such as a stylus, and/or some other external input object) to a computing device or other electronic device. For example, transcapacitive sensor device 100 can be implemented as a capacitive touch screen device that can, in some embodiments, be placed over an underlying image or an information display device (not shown). In this manner, a user would view the underlying image or information display by looking through the substantially transparent substrate 102 and the substantially transparent sensor electrodes (not illustrated) in transcapacitive sensor 108 of transcapacitive sensor device 100 as shown. Transcapacitive sensor 108 may be interchangeably referred to herein as both "transcapacitive sensor" and "sensor." It is noted that one or more embodiments, in accordance with the present invention, can be incorporated with a capacitive touch screen device similar to that of transcapacitive sensor device 100.

When in operation, transcapacitive sensor 108 is used to form a "sensing region" for sensing inputs. "Sensing region" as used herein is intended to broadly encompass any space above, around, in and/or near the sensor device wherein the sensor, or portion(s) thereof, is able to detect an input object. A sensing region, such as that formed by transcapacitive sensor 108, extends from a surface of the sensor device in one or more directions into space until the noise and decreased signal prevent accurate object detection. This distance may be on the order of less than a millimeter, millimeters, centimeters, or more, and may vary significantly with the type of position sensing technology used, the types of signals utilized for sensing, and the accuracy desired. Accordingly, the planarity, size, shape and exact locations of the particular sensing regions can vary widely from embodiment to embodiment.

Sensing regions with rectangular projected shape and many other shapes are possible. For example, depending on the design of the sensor pattern and surrounding circuitry, shielding from any input objects, and the like, sensing regions can be made to have two-dimensional projections of other shapes. Similar approaches can be used to define the three-dimensional shape of the sensing region. For example, any combination of sensor design, shielding, signal manipulation, sensor electrode scanning, and the like can effectively define a sensing region that has a distance in the third dimension.

Transcapacitive sensor device 100, when implemented as a touch screen, can include a substantially transparent substrate 102 having a first set of conductive routing traces 104 and a second set of conductive routing traces 106 patterned (or formed) coupled there to. Conductive routing traces 104 and/or 106 can be utilized for coupling processing system 110 with any sensor electrodes, arrays of sensor electrodes, and/or conductive traces that form a transcapacitive sensor 108. For purposes of example herein, conductive routing traces 104 are referred to as coupling transmitter pins of processing system 110 to transmitter electrodes of transcapacitive sensor 108, while conductive routing traces 106 are referred to as coupling receiver pins of processing system 110 to receiver electrodes of transcapacitive sensor 108. It is appreciated that, in practice, some embodiments described herein may both transmit and receive with some or all sensor electrodes of a transcapacitive sensor 108.

Although transcapacitive sensor 108 is depicted as rectangular, other shapes, such as circular, or triangular are anticipated. Sensor electrodes of transcapacitive sensor 108 can be formed of a substantially transparent conductive material. Indium tin oxide (ITO) is but one example of a substantially transparent conductive material that can be used to form one or more sensor electrodes or conductive traces of transcapacitive sensor 108. Some other non-limiting examples of substantially transparent conductive materials include very fine lines of metal, nanotube conductors, conductive coated films such as AgHT (a transparent highly conductive silver coated polyester film), and/or an ionic solution such a salt water. In FIG. 1, a contactable capacitive sensing reference surface or "cover layer" is not illustrated over transcapacitive sensor 108, so as not to obscure other portions which are being discussed. However, it is appreciated that such a capacitive sensing reference surface, which may be made of a clear material, typically separates transcapacitive sensor 108 from a user's input object.

Processing system 110 drives sensor electrode(s) with a voltage and senses resulting respective charge on sensor electrode(s), to acquire one or more measurements of capacitance with respect to transcapacitive sensor 108. Such measurement(s) of capacitance by processing system 110 enable the sensing of contact or other user input (e.g., gestures with one or more input objects) with respect to the sensing region formed by transcapacitive sensor 108. Such measurement(s) can also be utilized by processing system 110, in some embodiments, to determine positional information with respect to a user input relative to the sensing region formed by transcapacitive sensor 108. Processing system 110 may be implemented as one or more integrated circuits and/or discrete components. By sequencing the transmitters and deconvolving the resulting capacitance measurements, processing system 110 may determine the positions of one or more input objects. In one embodiment, processing system 110 includes or is implemented within an application specific integrated circuit (ASIC). In accordance with the embodiments described herein, such an ASIC can include components and/or embedded logic instructions for performing capacitance measurement(s) and determining contact, positional information, and/or other information from input object(s) interactions with respect to a sensing region of transcapacitive sensor 108.

The positional information determined by processing system 110 can be any suitable indicia of object presence. For example, the processing system can be implemented to determine "zero-dimensional" 1-bit positional information (e.g. near/far or contact/no contact) or "one-dimensional" positional information as a scalar (e.g. position or motion along a sensing region). Processing system 110 can also be implemented to determine multi-dimensional positional information as a combination of values (e.g. two-dimensional horizontal/vertical axes), and the like. Processing system 110 can also be implemented to determine information about time or history.

Furthermore, the term "positional information" as used herein is intended to broadly encompass absolute and relative position-type information, and also other types of spatial-domain information such as velocity, acceleration, and the like, including measurement of motion in one or more directions. Various forms of positional information may also include time history components, as in the case of gesture recognition and the like. The positional information from the processing system 110 facilitates a full range of interface inputs, including use of the proximity sensor device as a pointing device for cursor control, scrolling, and other functions.

Conductive routing traces 104 and 106 may each include one or more conductive coupling elements or traces. It is noted that some example embodiments of sensor electrode patterns, which may be used as transcapacitive sensor 108, are described herein in FIGS. 2A-5. It is appreciated that the examples of FIGS. 2A-5 are provided by way of example and not of limitation. In general, other capacitive sensor electrode patterns that follow the principles described herein can also be used in transcapacitive sensor 108 for measuring capacitance. This includes transcapacitive sensors comprising sensor electrodes disposed in a single layer (as depicted in FIGS. 2A-5) on surface 103 or even multi-layer sensor electrode patterns that follow the principles of the embodiments described herein.

Although described above with respect to a touch screen, transcapacitive sensor device 100 can also be implemented as a capacitive touchpad or other touch and/or position sensing device. For example, substrate 102 of transcapacitive sensor device 100 can be implemented with, but is not limited to, one or more clear or opaque materials that are utilized as a substrate for a capacitive touchpad device. In a similar manner, clear or opaque materials can also be utilized to form sensor electrodes in transcapacitive sensor 108. Additionally, clear or opaque materials can be used to implement a capacitive sensing reference surface or "cover layer" over transcapacitive sensor 108.

Example Transcapacitive Sensors

Figure 2A:
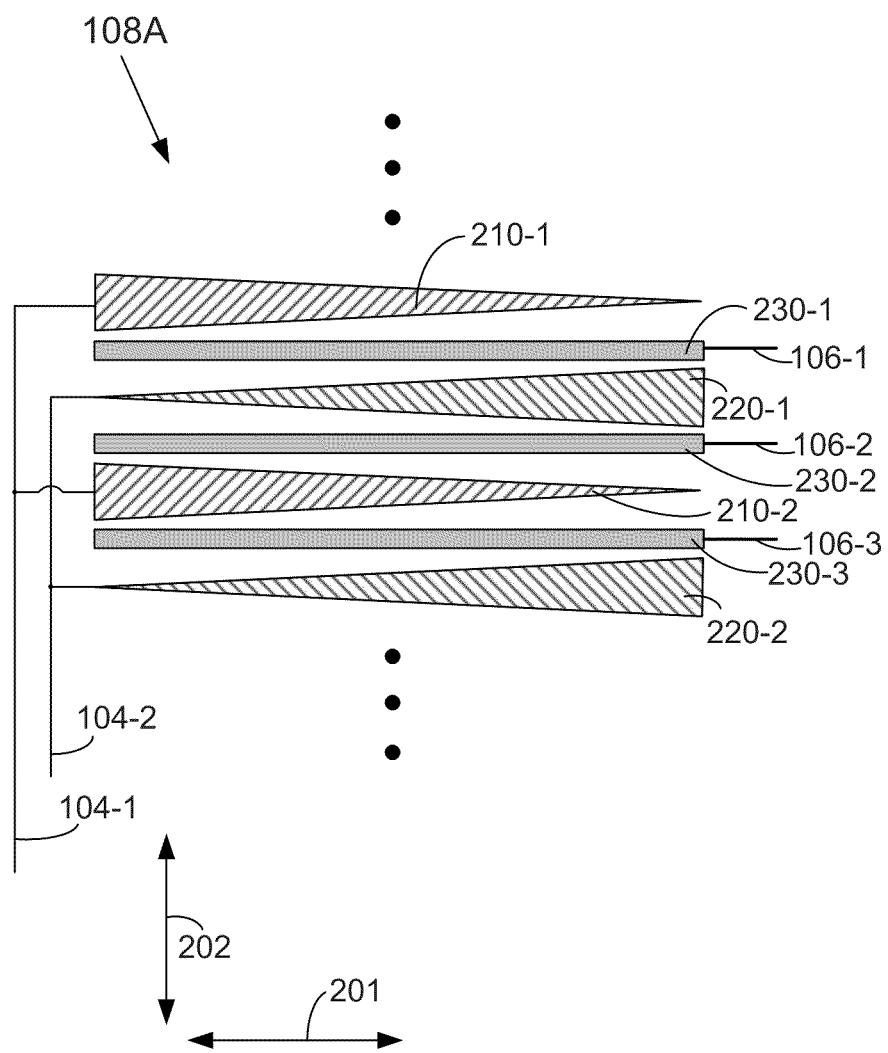
FIG. 2A illustrates a plan view of an example transcapacitive sensor that may be utilized with a transcapacitive sensor device, according to an embodiment.

FIG. 2A illustrates a plan view of an example transcapacitive sensor 108A that may be utilized with a transcapacitive sensor device, according to an embodiment. For example, transcapacitive sensor 108A represents an example of a transcapacitive sensor 108 that may be used with transcapacitive sensor device 100 of FIG. 1. As illustrated, transcapacitive sensor 108A includes a plurality of sensor electrodes (210-1, 210-2, 220-1, 220-2, 230-1, 230-2, and 230-3). Also illustrated in FIG. 2A are a first axis 201 and a second axis 202. Axes 201 and 202 will be referenced when describing the layout of the sensor electrode pattern that is illustrated in FIG. 2A. There are three sets of sensor electrodes illustrated in FIG. 2A: first set 210; second set 220, and third set 230. All three sets of sensor electrodes are disposed in a single, common layer with one another on a single surface (or upon a layer that is disposed on that surface) of a substrate (e.g., on surface 103 of substrate 102).

In first set 210 (210-1, 210-2, . . . ) individual sensor electrodes (e.g., sensor electrode 210-1) are triangular in shape with a long axis elongated on and substantially parallel with first axis 201. By "substantially parallel," what is meant herein is that the axis is intended to be parallel when the sensor electrode is disposed upon substrate 102, but that slight variations which may occur during manufacturing may cause minute, but acceptable variation, such as by a few degrees from parallel. With respect to sensor electrode 210-1, the width in the direction of second axis 202 varies in the direction of first axis 201 from a maximum on the left side of sensor 108A to a minimum on the right side (with left and right being relative to a direction along first axis 201). Sensor electrodes of first set 210 (e.g., 210-1 and 210-2) are substantially identical copies of one another that have been shifted by some distance on axis 202. By "substantially identical" what is meant herein is that small variances, such as may occur during manufacturing, are acceptable.

In second set 220 (220-1, 220-2, . . . ) individual sensor electrodes (e.g., sensor electrode 220-1) are triangular in shape with a long axis elongated on and substantially parallel with first axis 201. As can be seen, sensor electrodes (e.g., 220-1) of second set 220 are rotated mirror symmetric versions, or copies, of the sensor electrodes of first set 210. For example, sensor electrode 220-1 is a mirror symmetric (with respect to first axis 201) and 180 degree rotated version of sensor electrode 210-1. With respect to sensor electrode 220-1, the width in the direction of second axis 202 varies inversely to the width of sensor electrode 210-1. Sensor electrodes of second set 220 (e.g., 220-1 and 220-2) are substantially identical copies of one another that have been shifted by some distance on axis 202.

One reason for the rotation of the sensor electrodes of second set 220 relative to the sensor electrodes of first set 210 is that if all of the sensor electrodes were oriented in the same direction as either first set 210 or second set 220, it would be difficult or impossible in some instances to differentiate between input objects of differing sizes. For example, a small finger providing input in a region in which only large triangular ends of sensor electrodes were disposed might produce a similar or identical in change in transcapacitive coupling due to a very large finger providing input in a region where only the narrow triangular tips of the sensor electrodes were disposed. By interleaving the rotated sensor electrodes of second set 220 with the unrotated sensor electrodes of first set 210, as illustrated in FIG. 2A, this size differentiating issue is eliminated as input objects of differing size will produce differing changes in transcapacitive coupling.

In third set 230 (230-1, 230-2, 230-3 . . . ) individual sensor electrodes (e.g., sensor electrode 230-1) are rectangular in shape with a long axis elongated along and substantially parallel with first axis 201. As can be seen, sensor electrodes (e.g., 230-1) of third set 230 are repeated copies of one another. As depicted in FIG. 2A, in one embodiment, individual sensor electrodes (e.g., 230-1) of third set 230 are disposed between individual sensor electrodes of first set 210 and second set 220. For example, sensor electrode 230-1 is disposed between sensor electrode 210-1 and sensor electrode 220-1. It is appreciated that portions of the sensor electrode pattern of sensor 108A may be repeated in either direction along axis 202, and thus in some embodiments a pattern may leave a sensor electrode 230 on an upper or lower end of the pattern (with respect to axis 202) such that it is adjacent to but not bracketed between sensor electrodes.

In one embodiment, when sensor 108A is in operation, processing system 110 can create a first transcapacitive coupling between one or more sensor electrodes of first set 210 and one or more sensor electrodes of third set 230 by transmitting a first electrical signal to be emitted by one or more of the sensor electrodes of first set 210. Processing system 110 can acquire a capacitive measurement of the first transcapacitive coupling by receiving the emitted first electrical signal with a sensor electrode of third set 230. Similarly, via such acquisition, processing system 110 can measure changes in this first transcapacitive coupling ($\Delta C_{t1}$) that are caused by presence of an input object, such as input object 120, relative to transmitting and receiving sensor electrodes. This first transcapacitive coupling varies substantially along first axis 201. With reference to a transcapacitive coupling between sensor electrode 210-1 and sensor electrode 230-1, the transcapacitive coupling varies along axis 201 in accordance with variation in the width of sensor electrode 210-1 and the separation between sensor electrode 210-1 and sensor electrode 230-1. Thus, with respect to FIG. 2A and a first transcapacitive coupling between sensor electrode 210-1 and sensor electrode 230-1, this first transcapacitive coupling is strongest on the left side and weakest on the right side of sensor 108A.

It is appreciated that in one embodiment, processing system 110 can similarly acquire a capacitive measurement of the first transcapacitive coupling by emitting the first electrical signal with at least one sensor electrode of third set 230 (e.g., emitting with sensor electrode 230-1) and receiving the first electrical signal with at least one sensor electrode of first set 210 (e.g., receiving with sensor electrode 210-1).

In one embodiment, when sensor 108A is in operation, processing system 110 can create a second transcapacitive coupling between one or more sensor electrodes of second set 220 and one or more sensor electrodes of third set 230 by transmitting a first electrical signal to be emitted by one or more of the sensor electrodes of second set 220. Processing system 110 can acquire a measurement of the second transcapacitive coupling by receiving the emitted second electrical signal with a sensor electrode of third set 230. Similarly, via such acquisition, processing system 110 can measure changes in this second transcapacitive coupling ($\Delta C_{t2}$) that are caused by presence of an input object, such as input object 120, relative to transmitting and receiving sensor electrodes. This second transcapacitive coupling varies substantially along first axis 201. With reference to a transcapacitive coupling between sensor electrode 220-1 and sensor electrode 230-1, the transcapacitive coupling varies along axis 201 in accordance with variation in the width of sensor electrode 220-1 and the separation between sensor electrode 220-1 and sensor electrode 230-1. Thus, with respect to FIG. 2A and a second transcapacitive coupling between sensor electrode 220-1 and sensor electrode 230-1, this second transcapacitive coupling is strongest on the right side and weakest on the left side of sensor 108A.

It is appreciated that in one embodiment, processing system 110 can similarly acquire a capacitive measurement of the second transcapacitive coupling by emitting the second electrical signal with at least one sensor electrode of third set 230 (e.g., emitting with sensor electrode 230-1) and receiving the second electrical signal with at least one sensor electrode of second set 220 (e.g., receiving with sensor electrode 220-1).

For purposes of example, and not of limitation, sensor electrodes of first set 210 and second set 220 are referred to herein as transmitters and sensor electrodes of third set 230 are referred to herein as receivers. However, it is appreciated that sensor electrodes of any set (210, 220, and 230) may be used for either or both of transmitting and receiving. Following this example, in one embodiment, sensor electrodes of the first set 210 and the second set 220 are coupled to processing system 110 via routing traces 104, while sensor electrodes of third set 230 are coupled to processing system 110 via routing traces 106. If routing traces are required to cross one another, such crossings may be made outside of the sensing region of sensor 108A, thus allowing the sensor electrodes of sensor 108A to be disposed in a single layer with one another even if multiple fabrication layers (outside of a sensing region) are needed for coupling routing traces to the sensor electrodes of sensor 108A.

As depicted in FIG. 2A, sensor electrodes of first set 210 are commonly coupled to routing trace 104-1 and sensor electrodes of second set 220 are commonly coupled to routing trace 104-2. However, it is appreciated that in another embodiment, one or more sensor electrodes of first set 210 and/or of second set 220 may be individually coupled to a separate routing trace 104.

As depicted in FIG. 2A, each sensor electrode of third set 230 is individually coupled to a separate routing trace 106. For example, sensor electrode 230-1 is coupled with routing trace 106-1, sensor electrode 230-2 is coupled with routing trace 106-2, and sensor electrode 230-3 is coupled with routing trace 106-3. It is appreciated that, in another embodiment, one or more sensor electrodes of third set 230 may be commonly coupled to a single routing trace 106.

Figure 2B:
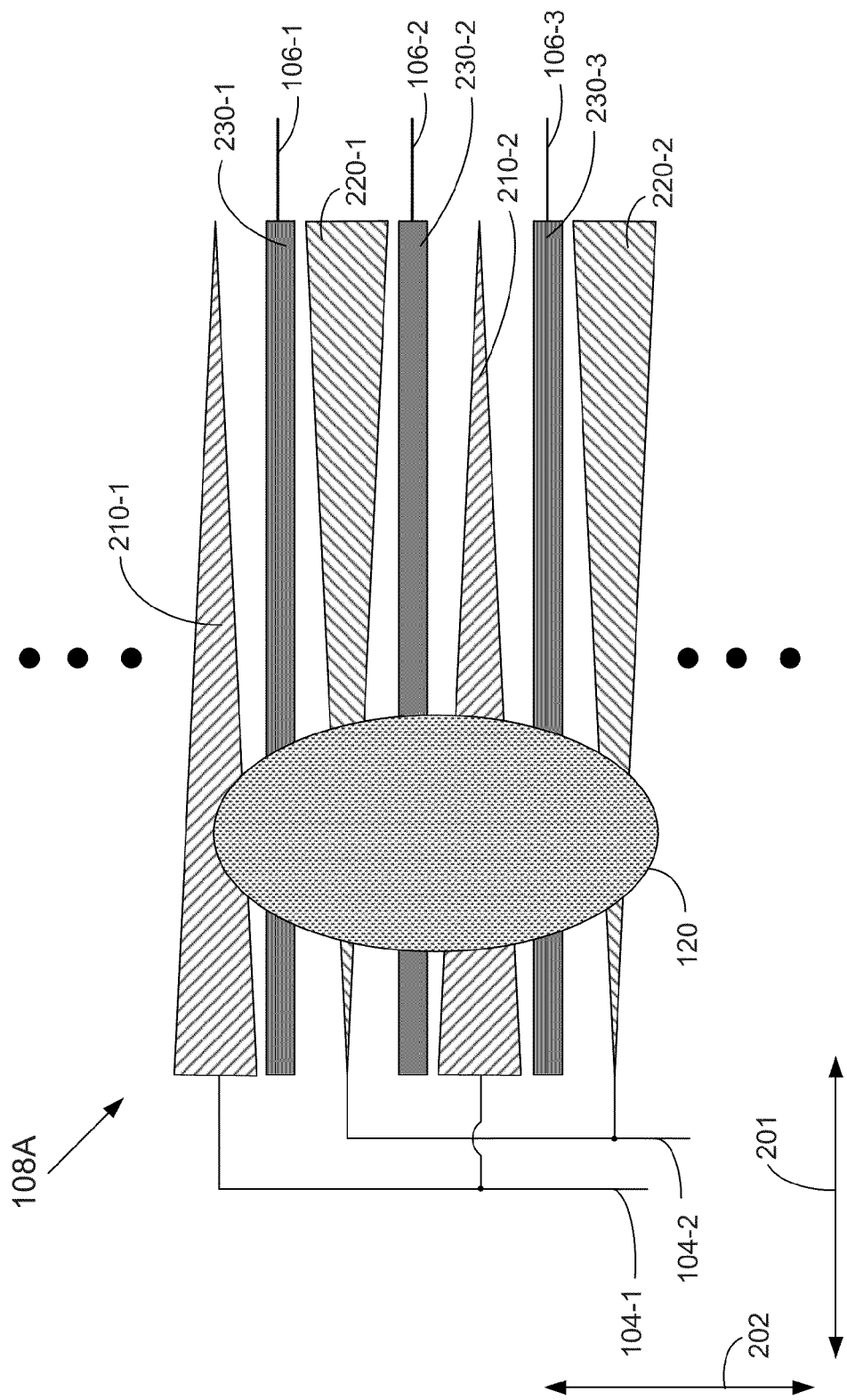
FIG. 2B illustrates a plan view of an example transcapacitive sensor that may be utilized with a transcapacitive sensor device with an input device interacting with sensor electrodes of the transcapacitive sensor, according to an embodiment.

FIG. 2B illustrates a plan view of an example transcapacitive sensor of FIG. 2A with an input device 120 interacting with sensor electrodes of the transcapacitive sensor, according to an embodiment. Processing system 110 (FIG. 1) can determine the size and x/y location of input object 120 by selectively transmitting and receiving on sensor electrodes of sensor 108A, measuring transcapacitive couplings, and then performing some calculations.

For example, in an embodiment where sensor electrodes 210 and 220 are used as transmitter sensor electrodes and sensor electrodes 230 are used as receiver sensor electrodes, processing system 100 can determine an "X" location of input object 120 along a receiver electrode.

In one embodiment, to determine the position of input object 120, processing system 110 acquires capacitive measurements of the transcapacitive couplings between sensor electrodes 210-1, 210-2 and 230-1, 230-2 and 230-3 and between sensor electrodes 220-1, 220-2 and 230-1, 230-2 and 230-3. For the following discussion, the capacitive measurement between 210-1 and 230-1 will be referred to as A1, the capacitive measurement between 220-1 and 230-1 will be referred to as B1, the capacitive measurement between 220-1 and 230-2 will be referred to as A2, the capacitive measurement between 210-2 and 230-2 will be referred to as B2, the capacitive measurement between 210-2 and 230-3 will be referred to as A3 and the capacitive measurement between 220-2 and 230-3 will be referred to as B3. In one embodiment, processing system 110 acquires capacitive measurements A1, A3 and B2 by transmitting with sensor electrodes 210-1 and 210-2 and receiving with sensor electrodes 230-1, 230-2 and 230-3 (at the same time or in a scanning method). Further, processing system 110 acquires capacitive measurements A2, B1 and B3 by transmitting with sensor electrode 220-1 and 220-2 and receiving with sensor electrodes 230-1, 230-2 and 230-3 (at the same time or in a scanning method). In other embodiments processing system 110 transmits with sensor electrodes 210-1, 210-2, 220-1 and 220-2 one at a time, while receiving with sensor electrodes 230-1, 230-2 and 230-2 at the same time or in a scanning method. In further embodiments, processing system 110 transmits electrical signals based on different codes on a set of sensor electrodes 210-1, 210-2, 220-1 and 220-2 at the same time while receiving the electrical signals with sensor electrodes 230-1, 230-2 and 230-3 at the same time or in a scanning method. In various embodiments, processing system 110 is able to determine the change in transcapacitive coupling between adjacent transmitting and receiving sensor electrodes based on the capacitive measurements A1, A2, A3, B1, B2 and B3.

Processing system 110 determines the position of input object 120 along first axis 201 (e.g., "X" component of position) on a sensor electrode configured to receive an electrical signal based on pairs of corresponding capacitive measurements. For example, processing system 110 can determine the position of input object 120 along first axis 201 (e.g., "X" component of position) on sensor electrode 230-1 based on the capacitive measurements made between sensor electrode 230-1 and 210-1 (capacitive measurement A1) and between 230-1 and 220-1 (capacitive measurement B1). Further, it is also possible to calculate the position of input object 120 along first axis 201 (e.g., "X" component of position) on sensor electrode 230-2 and/or sensor electrode 230-3. Processing system 110 determines position on sensor electrode 230-2 based on capacitive measurements A2 and B2 and position on sensor electrode 230-3 based on capacitive measurements A3 and B3. In one embodiment, processing system 110 determines a ratio of the two capacitive measurements. For example, to determine position on sensor electrode 230-1, processing system determines a ratio of A1 and B1; to determine position on sensor electrode 230-2 processing system determines a ratio of A2 and B2; and to determine position on sensor electrode 230-3 processing system 110 determine a ratio of A3 and B3. In a further embodiment, processing system 110 uses (A/A+B) to compute position on a sensor electrode. For example, processing system 110 computes A1/(A1+B1) to determine position on sensor electrode 230-1. In one embodiment, processing system 110 determines the position of input object 120 along first axis 201 (e.g., "X" component of position) on at least one sensor electrode configured to receive an electrical signal (e.g., sensor electrode 230-1, sensor electrode 230-2 and sensor electrode 230-3). In a further embodiment, processing system 110 determines the position of input object 120 along first axis 201 (e.g., "X" component of position) on each sensor electrode configured to receive an electrical signal (e.g., sensor electrode 230-1, sensor electrode 230-2 and sensor electrode 230-3).

Processing system 110 determines the position along second axis 202 ("Y" component of position) of input object 120, in one embodiment, by adding corresponding capacitive measurements and then using a technique such as interpolation or some other form of peak detect to determine which measurement(s) are the strongest and thus indicative of the "Y" location. For example, by adding A1+B1, A2+B2 and A3+B3 processing system 110 achieves values upon which interpolation or some other version of peak detect could be used to determine the location of input object 120 along axis 202 relative to sensor 108A.

Figure 3:
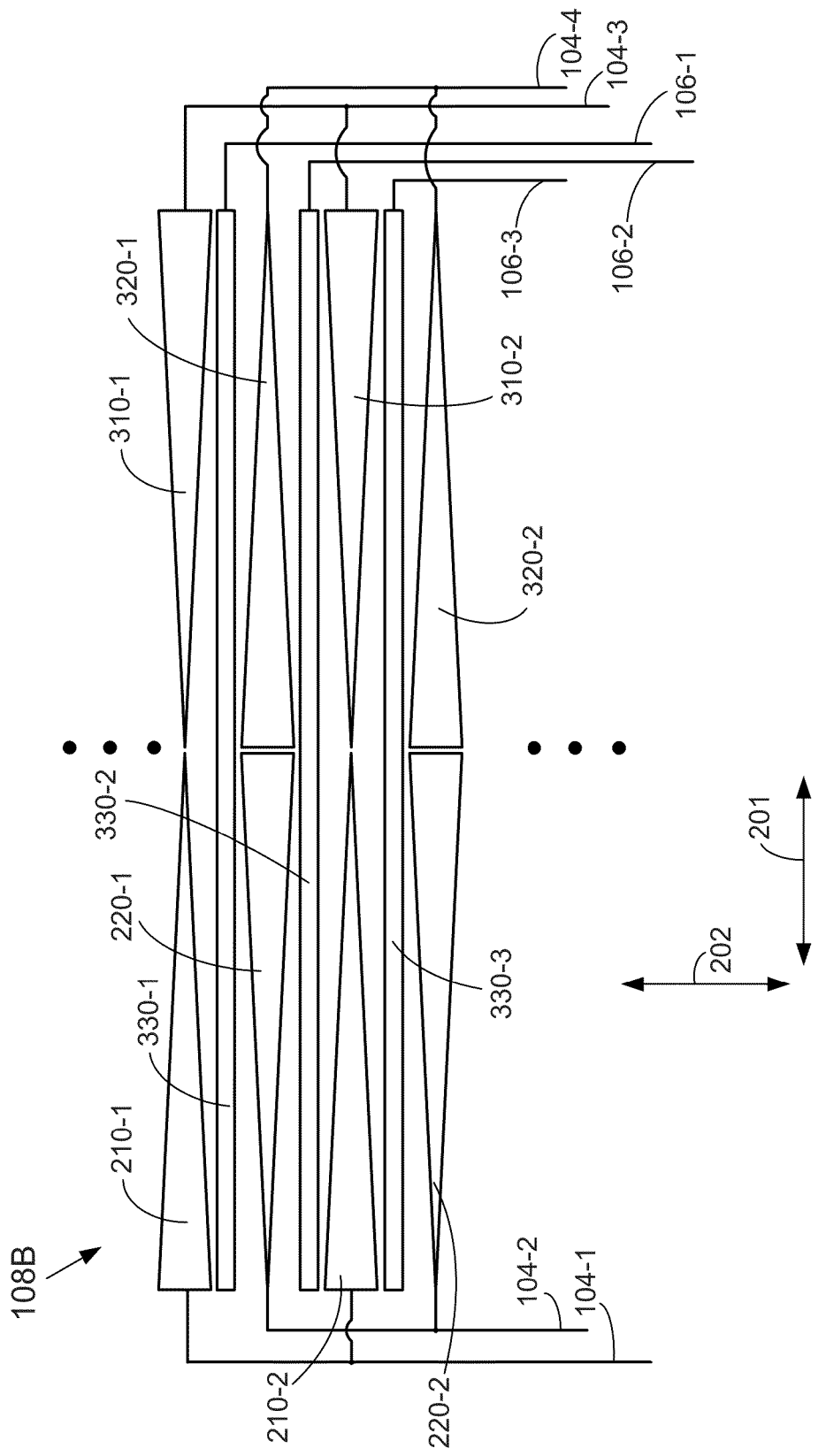
FIG. 3 illustrates a plan view of an example transcapacitive sensor that may be utilized with a transcapacitive sensor device, according to an embodiment.

FIG. 3 illustrates a plan view of an example transcapacitive sensor 108B that may be utilized with a transcapacitive sensor device, according to an embodiment. For example, transcapacitive sensor 108B represents an example of a transcapacitive sensor 108 that may be used with transcapacitive sensor device 100 of FIG. 1. As illustrated, transcapacitive sensor 108B includes a plurality of sensor electrodes (210-1, 210-2, 220-1, 220-2, 310-1, 310-2, 320-1, 320-2, 330-1, 330-2, and 330-3). Like numbered features of FIG. 3 operated in the same fashion as like numbered features of FIG. 2A. There are five sets of sensor electrodes illustrated in FIG. 2A: first set 210; second set 220, third set 330, fourth set 310, and fifth set 320. All five sets of sensor electrodes are disposed in a single, common layer with one another on a single surface (or upon a layer that is disposed on that surface) of a substrate (e.g., on surface 103 of substrate 102). Processing system 110 (FIG. 1) can utilize similar techniques to those described in conjunction with FIG. 2B and sensor 108A for determining two dimensional positional information of an input object relative to the sensor electrodes of sensor 108B.

In third set 330 (330-1, 330-2, 330-3 . . . ) individual sensor electrodes (e.g., sensor electrode 330-1) are rectangular in shape with a long axis elongated along and substantially parallel with first axis 201. Sensor electrodes of third set 330 are similar to those of third set 230 of FIG. 1 except that a lengthwise edge of a sensor electrode of third set 330 spans multiple sets of sensor electrodes along axis 201. In another embodiment (not illustrated), sensor electrodes of third set 320 can be divided in to two subsets at their midpoints along axis 201. This would result in having one set of sensor electrodes that are identically located and shaped to sensor electrodes 230 of FIG. 2A, and a second mirror symmetric copy that is laterally shifted a distance along axis 201.

As can be seen, sensor electrodes (e.g., 330-1) of third set 330 are repeated copies of one another. As depicted in FIG. 3, in one embodiment, individual sensor electrodes (e.g., 330-1) of third set 330 are disposed between individual sensor electrodes first set 210 and second set 220 as well as between individual sensor electrodes of fourth set 310 and fifth set 320. For example, sensor electrode 330-1 is disposed between sensor electrode 210-1 and sensor electrode 220-1 on its left half along axis 201 and between sensor electrode 310-1 and sensor electrode 320-1 on its right half along axis 201. It is appreciated that portions of the sensor electrode pattern of sensor 108B may be repeated in either direction along axis 202, and thus in some embodiments a pattern may be truncated such that it leaves a sensor electrode 330 on an upper or lower end (with respect to axis 202) such that it is adjacent to but not bracketed between sensor electrodes.

In fourth set 310 (310-1, 310-2, . . . ) individual sensor electrodes (e.g., sensor electrode 310-1) are triangular in shape with a long axis elongated on and substantially parallel with first axis 201. Sensor electrodes of fourth set 310 are mirror symmetric about axis 202 to the sensor electrodes of first set 210. Sensor electrodes of fourth set 310 are fashioned in and operationally function in a similar, but mirror symmetric manner to the sensor electrodes of first set 210. With respect to sensor electrode 310-1, the width in the direction of second axis 202 varies in the direction of first axis 201 from a minimum in the middle of sensor 108B to a maximum on the right side of sensor 108B (with middle and right being relative to a direction along first axis 201). Sensor electrodes of fourth set 310 (e.g., 310-1 and 310-2) are substantially identical copies of one another that have been shifted by some distance on axis 202.

In fifth set 320 (320-1, 320-2, . . . ) individual sensor electrodes (e.g., sensor electrode 320-1) are triangular in shape with a long axis elongated on and substantially parallel with first axis 201. Sensor electrodes of fifth set 320 are mirror symmetric about axis 202 to the sensor electrodes of second set 220. Sensor electrodes of fifth set 320 are fashioned in and operationally function in a similar, but mirror symmetric manner to the sensor electrodes of second set 220. With respect to sensor electrode 320-1, the width in the direction of second axis 202 varies in the direction of first axis 201 from a maximum in the middle of sensor 108B to a minimum on the right side of sensor 108B (with middle and right being relative to a direction along first axis 201). Sensor electrodes of fifth set 320 (e.g., 320-1 and 320-2) are substantially identical copies of one another that have been shifted by some distance on axis 202.

In one embodiment, when sensor 108B is in operation, processing system 110 can create a first transcapacitive coupling between one or more sensor electrodes of first set 210 and one or more sensor electrodes of third set 330 by transmitting a first electrical signal to be emitted by one or more of the sensor electrodes of first set 210. Processing system 110 can acquire a measurement of the first transcapacitive coupling by receiving the emitted first electrical signal with a sensor electrode of third set 330. Similarly, via such acquisition, processing system 110 can measure changes in this first transcapacitive coupling ($\Delta C_{t1}$) that are caused by presence of an input object, such as input object 120, relative to transmitting and receiving sensor electrodes. This first transcapacitive coupling varies substantially along first axis 201. With reference to a transcapacitive coupling between sensor electrode 210-1 and sensor electrode 330-1, the transcapacitive coupling varies along axis 201 in accordance with variation in the width of sensor electrode 210-1 and the separation between sensor electrode 210-1 and sensor electrode 330-1. Thus, with respect to FIG. 3 and a first transcapacitive coupling between sensor electrode 210-1 and sensor electrode 330-1, this first transcapacitive coupling is strongest on the left side and weakest in the middle of sensor 108B.

It is appreciated that in one embodiment, processing system 110 can similarly acquire a capacitive measurement of the first transcapacitive coupling by emitting the first electrical signal with at least one sensor electrode of third set 330 (e.g., emitting with sensor electrode 330-1) and receiving the first electrical signal with at least one sensor electrode of first set 210 (e.g., receiving with sensor electrode 210-1).

In one embodiment, when sensor 108B is in operation, processing system 110 can create a second transcapacitive coupling between one or more sensor electrodes of second set 220 and one or more sensor electrodes of third set 330 by transmitting a second electrical signal to be emitted by one or more of the sensor electrodes of second set 220. Processing system 110 can acquire a measurement of the second transcapacitive coupling by receiving the emitted second electrical signal with a sensor electrode of third set 330. Similarly, via such acquisition, processing system 110 can measure changes in this second transcapacitive coupling ($\Delta C_{t2}$) that are caused by presence of an input object, such as input object 120, relative to transmitting and receiving sensor electrodes. This second transcapacitive coupling varies substantially along first axis 201. With reference to a transcapacitive coupling between sensor electrode 220-1 and sensor electrode 330-1, the transcapacitive coupling varies along axis 201 in accordance with variation in the width of sensor electrode 220-1 and the separation between sensor electrode 220-1 and sensor electrode 330-1. Thus, with respect to FIG. 3 and a second transcapacitive coupling between sensor electrode 220-1 and sensor electrode 330-1, this second transcapacitive coupling is strongest in the middle and weakest on the left side of sensor 108B.

It is appreciated that in one embodiment, processing system 110 can similarly acquire a capacitive measurement of the second transcapacitive coupling by emitting the second electrical signal with at least one sensor electrode of third set 330 (e.g., emitting with sensor electrode 330-1) and receiving the second electrical signal with at least one sensor electrode of second set 220 (e.g., receiving with sensor electrode 220-1).

In one embodiment, when sensor 108B is in operation, processing system 110 can create a third transcapacitive coupling between one or more sensor electrodes of fourth set 310 and one or more sensor electrodes of third set 330 by transmitting a third electrical signal to be emitted by one or more of the sensor electrodes of third set 310. Processing system 110 can acquire a measurement of the third transcapacitive coupling by receiving the emitted third electrical signal with a sensor electrode of third set 330. Similarly, via such acquisition, processing system 110 can measure changes in this third transcapacitive coupling ($\Delta C_{t3}$) that are caused by presence of an input object, such as input object 120, relative to transmitting and receiving sensor electrodes. This third transcapacitive coupling varies substantially along first axis 201. With reference to a transcapacitive coupling between sensor electrode 310-1 and sensor electrode 330-1, the transcapacitive coupling varies along axis 201 in accordance with variation in the width of sensor electrode 310-1 and the separation between sensor electrode 310-1 and sensor electrode 330-1. Thus, with respect to FIG. 3 and third transcapacitive coupling between sensor electrode 310-1 and sensor electrode 330-1, this third transcapacitive coupling is strongest on the right side and weakest in the middle of sensor 108B.

It is appreciated that in one embodiment, processing system 110 can similarly acquire a capacitive measurement of the third transcapacitive coupling by emitting the third electrical signal with at least one sensor electrode of third set 330 (e.g., emitting with sensor electrode 330-1) and receiving the third electrical signal with at least one sensor electrode of fourth set 310 (e.g., receiving with sensor electrode 310-1).

In one embodiment, when sensor 108B is in operation, processing system 110 can create a fourth transcapacitive coupling between one or more sensor electrodes of fifth set 320 and one or more sensor electrodes of third set 330 by transmitting a fourth electrical signal to be emitted by one or more of the sensor electrodes of fifth set 320. Processing system 110 can acquire a measurement of the fourth transcapacitive coupling by receiving the emitted fourth electrical signal with a sensor electrode of third set 330. Similarly, via such acquisition, processing system 110 can measure changes in this fourth transcapacitive coupling ($\Delta C_{t4}$) that are caused by presence of an input object, such as input object 120, relative to transmitting and receiving sensor electrodes. This fourth transcapacitive coupling varies substantially along first axis 201. With reference to a transcapacitive coupling between sensor electrode 320-1 and sensor electrode 330-1, the transcapacitive coupling varies along axis 201 in accordance with variation in the width of sensor electrode 320-1 and the separation between sensor electrode 320-1 and sensor electrode 330-1. Thus, with respect to FIG. 3 and a fourth transcapacitive coupling between sensor electrode 320-1 and sensor electrode 330-1, this fourth transcapacitive coupling is strongest in the middle and weakest on the right side of sensor 108B.

It is appreciated that in one embodiment, processing system 110 can similarly acquire a capacitive measurement of the fourth transcapacitive coupling by emitting the fourth electrical signal with at least one sensor electrode of third set 330 (e.g., emitting with sensor electrode 330-1) and receiving the fourth electrical signal with at least one sensor electrode of fifth set 320 (e.g., receiving with sensor electrode 320-1).

For purposes of example, and not of limitation, sensor electrodes of first set 210, second set 220, third set 330, fourth set 310 and fifth set 320 are referred to herein as transmitters and sensor electrodes of third set 330 are referred to herein as receivers. However, it is appreciated that sensor electrodes of any set (210, 220, 310, 320, and 330) may be used for either or both of transmitting and receiving. Following this example, in one embodiment, sensor electrodes of the first set 210, second set 220, fourth set 310, and fifth set 320 are coupled to processing system 110 via routing traces 104, while sensor electrodes of third set 330 are coupled to processing system 110 via routing traces 106. If routing traces are required to cross one another, such crossings may be made outside of the sensing region of sensor 108A, thus allowing the sensor electrodes of sensor 108B to be disposed in a single layer with one another even if multiple fabrication layers (outside of a sensing region) are needed for coupling routing traces to the sensor electrodes of sensor 108B.

As depicted in FIG. 3, sensor electrodes of first set 210 are commonly coupled to routing trace 104-1; sensor electrodes of second set 220 are commonly coupled to routing trace 104-2; sensor electrodes of third set 310 are commonly coupled to routing trace 104-3; and sensor electrodes of fifth set 320 are commonly coupled to routing trace 104-4. However, it is appreciated that in another embodiment, one or more of the sensor electrode of first set 210, second set 220, fourth set 310 and/or fifth set 320 may be individually coupled to a separate routing trace 104.

As depicted in FIG. 3, each sensor electrode of third set 330 is individually coupled to a separate routing trace 106. For example, sensor electrode 330-1 is coupled with routing trace 106-1, sensor electrode 330-2 is coupled with routing trace 106-2, and sensor electrode 330-3 is coupled with routing trace 106-3. It is appreciated that, in another embodiment, one or more of the sensor electrodes of third set 330 may be commonly coupled to a single routing trace 106.

Figure 4:
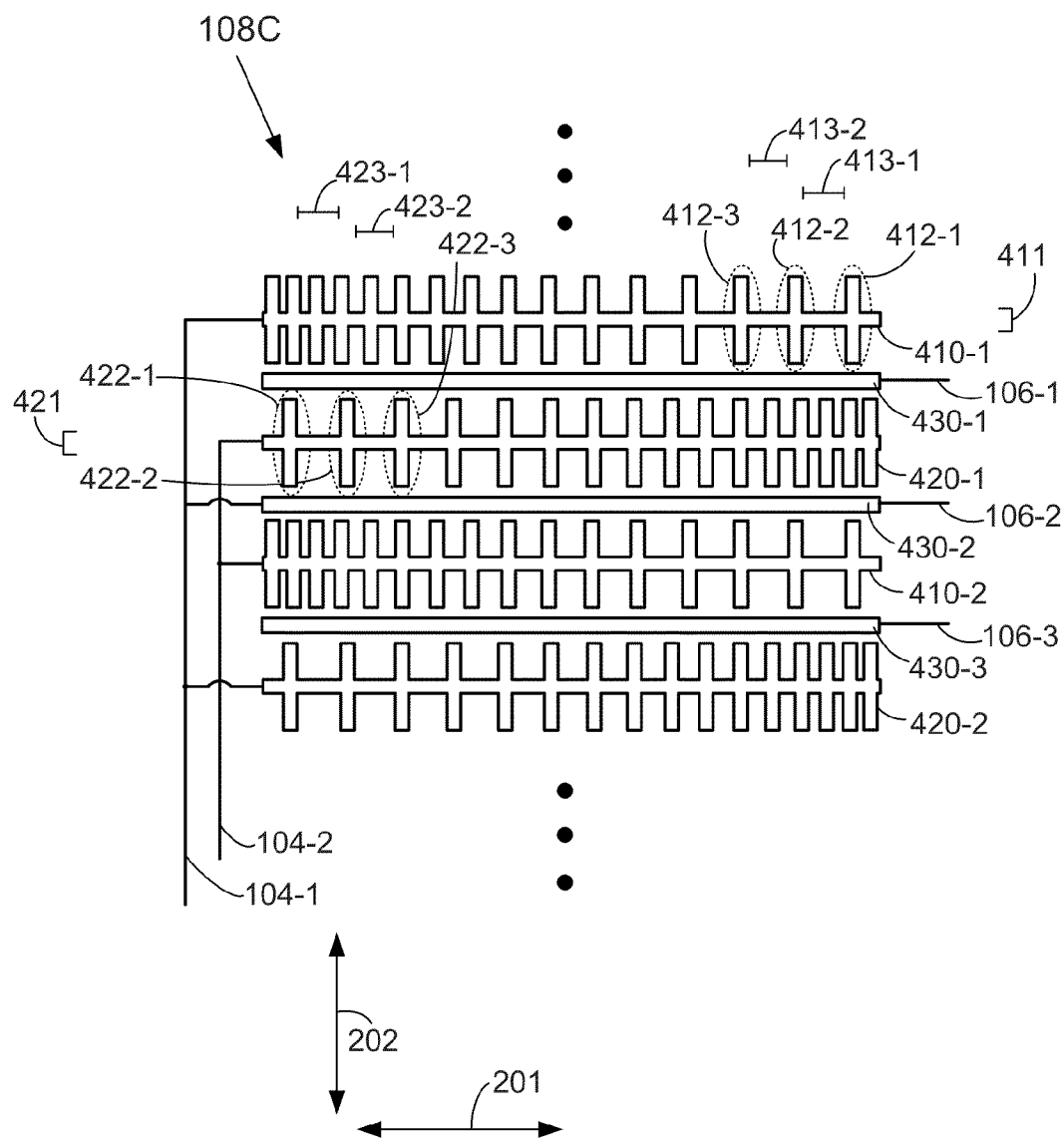
FIG. 4 illustrates a plan view of an example transcapacitive sensor that may be utilized with a transcapacitive sensor device, according to an embodiment.

FIG. 4 illustrates a plan view of an example transcapacitive sensor 108C that may be utilized with a transcapacitive sensor device, according to an embodiment. For example, transcapacitive sensor 108C represents an example of a transcapacitive sensor 108 that may be used with transcapacitive sensor device 100 of FIG. 1. As illustrated, transcapacitive sensor 108C includes a plurality of sensor electrodes (410-1, 410-2, 420-1, 420-2, 430-1, 430-2, and 430-3). Also illustrated in FIG. 4 are a first axis 201 and a second axis 202. Axes 201 and 202 will be referenced when describing the layout of the sensor electrode pattern that is illustrated in FIG. 4. There are three sets of sensor electrodes illustrated in FIG. 4: first set 410; second set 420, and third set 430. All three sets of sensor electrodes are disposed in a single, common layer with one another on a single surface (or upon a layer that is disposed on that surface) of a substrate (e.g., on surface 103 of substrate 102). Processing system 110 (FIG. 1) can utilize similar techniques to those described in conjunction with FIG. 2B and sensor 108A for determining two-dimensional positional information of an input object relative to the sensor electrodes of sensor 108C.

In first set 410 (410-1, 410-2, . . . ) individual sensor electrodes (e.g., sensor electrode 410-1) have a substantially rectangular shaped body (e.g., body 411 of sensor electrode 410) with a plurality of rectangular segments 412 (e.g., 412-1, 412-2, etc.) protruding perpendicular to a long side of the rectangular body. By "substantially rectangular" what is meant herein is that small variances from true rectangular, such as may occur during manufacturing, are acceptable. It is appreciated that in some embodiments the segments may protrude at an angle which is oblique rather than perpendicular as illustrated. The distance between adjacent segments of the plurality of rectangular segments varies along axis 201. With respect to sensor electrode 410-1, the distance between each adjacent pair of segments becomes increasingly smaller in a right to left direction along axis 201. For example, distance 413-2 between adjacent segments 412-2 and 412-3 is less than distance 413-1 between adjacent segments 412-1 and 412-2. Sensor electrodes of first set 410 are mirror symmetrical along their long axis. For example upper and lower portions of sensor electrode 410-1 are mirror symmetrical if folded lengthwise on body 411 along the length of axis 201. Sensor electrodes of first set 410 (e.g., 410-1 and 410-2) are substantially identical copies of one another that have been shifted by some distance on axis 202.

In second set 420 (420-1, 420-2, . . . ) individual sensor electrodes (e.g., sensor electrode 420-1) have a substantially rectangular shaped body with a plurality of rectangular segments 412 protruding perpendicular to a long side of the rectangular body. As can be seen, sensor electrodes (e.g., 420-1) of second set 420 are rotated mirror symmetric versions, or copies, of the sensor electrodes of first set 410. For example, sensor electrode 420-1 is a mirror symmetric (with respect to first axis 201) and 180 degree rotated version of sensor electrode 410-1. Due to being rotated mirror symmetric copies of the sensor electrodes of first set 410, the distance between adjacent protruding segments of any sensor electrode of second set 420 varies along first axis 201 in an inverse fashion to that of a sensor electrode of first set 410. Thus with respect to sensor electrode 420-1, the distance between each adjacent pair of segments becomes increasingly smaller in a left to right direction along axis 201. For example, distance 423-2 between adjacent segments 422-2 and 422-3 is less than distance 423-1 between adjacent segments 422-1 and 422-2. Sensor electrodes of second set 420 (e.g., 420-1 and 420-2) are substantially identical copies of one another that have been shifted by some distance on axis 202.

In third set 430 (430-1, 430-2, 430-3 . . . ) individual sensor electrodes (e.g., sensor electrode 430-1) are rectangular in shape with a long axis elongated along and substantially parallel with first axis 201. As can be seen, sensor electrodes (e.g., 430-1) of third set 430 are repeated copies of one another. As depicted in FIG. 4, in one embodiment, individual sensor electrodes (e.g., 430-1) of third set 230 are disposed between individual sensor electrodes first set 410 and second set 420. For example, sensor electrode 430-1 is disposed between sensor electrode 410-1 and sensor electrode 420-1. It is appreciated that portions of the sensor electrode pattern of sensor 108C may be repeated in either direction along axis 202, and thus in some embodiments a pattern may leave a sensor electrode 430 on an upper or lower end of the pattern (with respect to axis 202) such that it is adjacent to but not bracketed between sensor electrodes.

In one embodiment, when sensor 108C is in operation, processing system 110 can create a first transcapacitive coupling between one or more sensor electrodes of first set 410 and one or more sensor electrodes of third set 430 by transmitting a first electrical signal to be emitted by one or more of the sensor electrodes of first set 410. Processing system 110 can acquire a capacitive measurement of the first transcapacitive coupling by receiving the emitted first electrical signal with a sensor electrode of third set 430. Similarly, via such acquisition, processing system 110 can measure changes in this first transcapacitive coupling ($\Delta C_{t1}$) that are caused by presence of an input object, such as input object 120, relative to transmitting and receiving sensor electrodes. This first transcapacitive coupling varies substantially along first axis 201. With reference to a transcapacitive coupling between sensor electrode 410-1 and sensor electrode 430-1, the transcapacitive coupling varies along axis 201 in accordance with variation in the distance between protruding segments of sensor electrode 410-1. Thus, with respect to FIG. 4 and a first transcapacitive coupling between sensor electrode 410-1 and sensor electrode 430-1, this first transcapacitive coupling is strongest on the left side and weakest on the right side of sensor 108C.

It is appreciated that in one embodiment, processing system 110 can similarly acquire a capacitive measurement of the first transcapacitive coupling by emitting the first electrical signal with at least one sensor electrode of third set 430 (e.g., emitting with sensor electrode 430-1) and receiving the first electrical signal with at least one sensor electrode of first set 410 (e.g., receiving with sensor electrode 410-1).

In one embodiment, when sensor 108C is in operation, processing system 110 can create a second transcapacitive coupling between one or more sensor electrodes of second set 420 and one or more sensor electrodes of third set 430 by transmitting a second electrical signal to be emitted by one or more of the sensor electrodes of second set 420. Processing system 110 can acquire a measurement of the second transcapacitive coupling by receiving the emitted second electrical signal with a sensor electrode of third set 430. Similarly, via such acquisition, processing system 110 can measure changes in this second transcapacitive coupling ($\Delta C_{t2}$) that are caused by presence of an input object, such as input object 120, relative to transmitting and receiving sensor electrodes. This second transcapacitive coupling varies substantially along first axis 201. With reference to a transcapacitive coupling between sensor electrode 420-1 and sensor electrode 430-1, the transcapacitive coupling varies along axis 201 in accordance with variation in the distance between protruding segments of sensor electrode 420-1. Thus, with respect to FIG. 4 and a second transcapacitive coupling between sensor electrode 420-1 and sensor electrode 430-1, this second transcapacitive coupling is strongest on the right side and weakest on the left side of sensor 108C.

It is appreciated that in one embodiment, processing system 110 can similarly acquire a capacitive measurement of the second transcapacitive coupling by emitting the second electrical signal with at least one sensor electrode of third set 430 (e.g., emitting with sensor electrode 430-1) and receiving the second electrical signal with at least one sensor electrode of second set 420 (e.g., receiving with sensor electrode 420-1).

For purposes of example, and not of limitation, sensor electrodes of first set 410 and second set 420 are referred to herein as transmitters and sensor electrodes of third set 430 are referred to herein as receivers. However, it is appreciated that sensor electrodes of any set (410, 420, and 430) may be used for either or both of transmitting and receiving. Following this example, in one embodiment, sensor electrodes of the first set 410 and the second set 420 are coupled to processing system 110 via routing traces 104, while sensor electrodes of third set 430 are coupled to processing system 110 via routing traces 106. If routing traces are required to cross one another, such crossings may be made outside of the sensing region of sensor 108C, thus allowing the sensor electrodes of sensor 108C to be disposed in a single layer with one another even if multiple fabrication layers (outside of a sensing region) are needed for coupling routing traces to the sensor electrodes of sensor 108C.

As depicted in FIG. 4, sensor electrodes of first set 410 are commonly coupled to routing trace 104-1 and sensor electrodes of second set 420 are commonly coupled to routing trace 104-2. However, it is appreciated that in another embodiment, one or more sensor electrodes of first set 410 and/or of second set 420 may be individually coupled to a separate routing trace 104.

As depicted in FIG. 4, each sensor electrode of third set 430 is individually coupled to a separate routing trace 106. For example, sensor electrode 430-1 is coupled with routing trace 106-1, sensor electrode 430-2 is coupled with routing trace 106-2, and sensor electrode 430-3 is coupled with routing trace 106-3. It is appreciated that, in another embodiment, one or more sensor electrodes of third set 430 may be commonly coupled to a single routing trace 106.

In other embodiments, the lengths of rectangular segments 412 and 422 vary along the length of sensor electrodes 410 and 420. In one example, the length of rectangular segment 412-1 is greater than the length of rectangular segment 412-2 which is greater than the length of rectangular segment 412-3 and so forth. In this fashion the length of rectangular segments decreases from the right side to the left side of sensor electrodes 410 along axis 201. Further, in one such embodiment, the length of rectangular segment 422-1 is greater than the length of rectangular segment 422-2 which is greater than the length of rectangular segment 422-3 and so forth. In this fashion, the length of rectangular segments decreases from the left side to the right side of sensor electrodes 420 along axis 201. In various embodiments, while the lengths of rectangular segments 412 and 423 vary, the distances 413 and 423 do not vary. In other embodiments, while the lengths of rectangular segments 412 and 423 vary, the distances 413 and 423 also vary. In many embodiments, the rectangular segments protrude an equal distance above and below each sensor electrode.

The varied length of rectangular segments with or without the varied distance between rectangular segments is configured to create a transcapactive coupling that varies between transmitter and receiver sensor electrodes. Thus, similar transcapacitive couplings variations between transmitter and receiver sensor electrodes can be achieved with rectangular shapes of FIG. 4 as with the wedge shapes of FIGS. 2A, 2B, and 3. For example, where the rectangular segments are longer, the transcapacitive coupling between transmitter and receiver sensor electrodes can be considered stronger, and where the rectangular segments are shorter, the transcapacitive coupling between transmitter and receiver sensor electrodes can be considered weaker.

It is appreciated that the embodiments depicted and described in conjunction with sensor 108C of FIG. 4 can be expanded in a similar manner to the manner in which sensor 108B of FIG. 3 expands the arrangement of sensor 108A of FIG. 2A.

Figure 5:
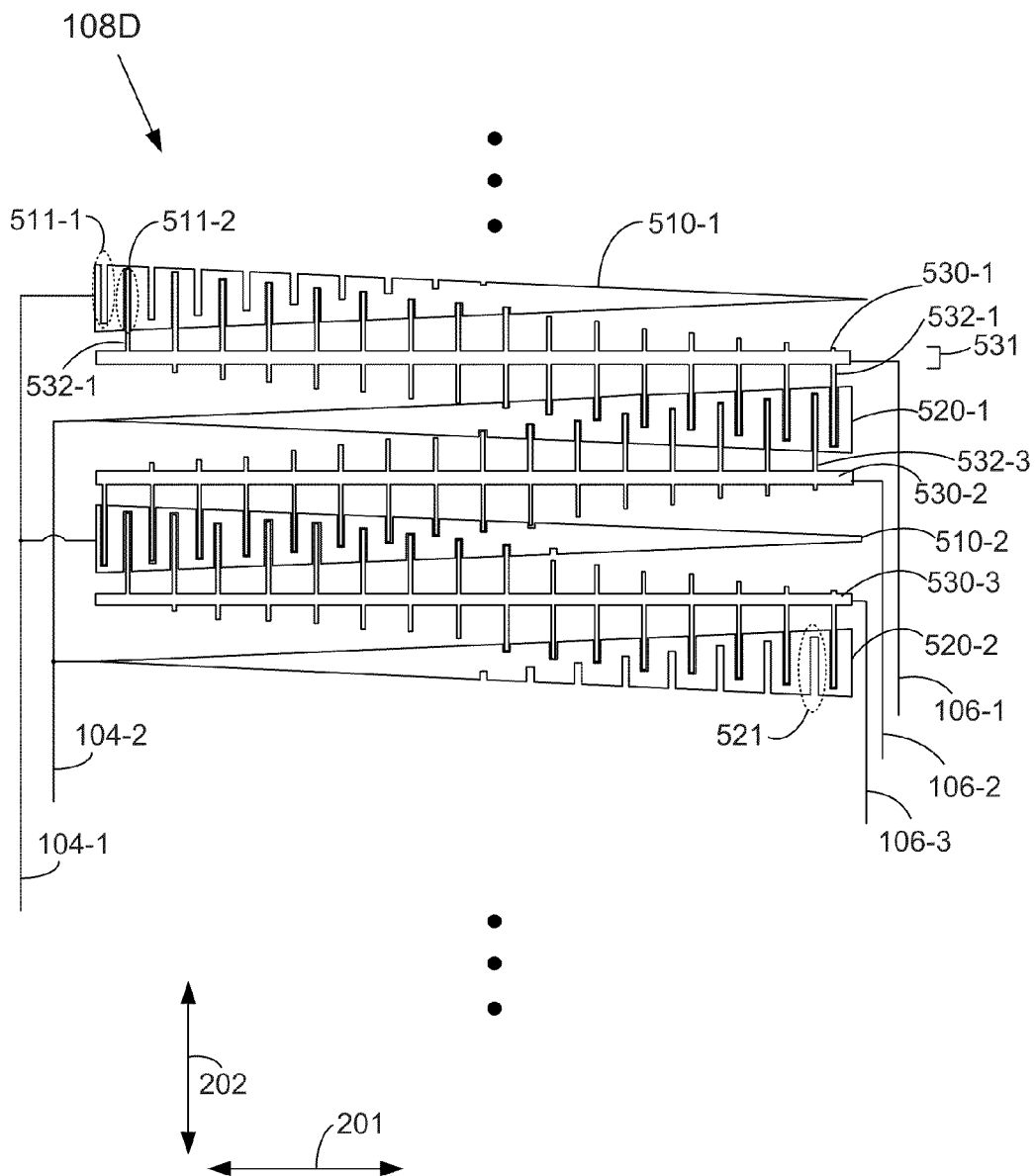
FIG. 5 illustrates a plan view of an example transcapacitive sensor that may be utilized with a transcapacitive sensor device, according to an embodiment.

FIG. 5 illustrates a plan view of an example transcapacitive sensor 108D that may be utilized with a transcapacitive sensor device, according to an embodiment. For example, transcapacitive sensor 108D represents an example of a transcapacitive sensor 108 that may be used with transcapacitive sensor device 100 of FIG. 1. As illustrated, transcapacitive sensor 108D includes a plurality of sensor electrodes (510-1, 510-2, 520-1, 520-2, 530-1, 530-2, and 530-3). Also illustrated in FIG. 5 are a first axis 201 and a second axis 202. Axes 201 and 202 will be referenced when describing the layout of the sensor electrode pattern that is illustrated in FIG. 5. There are three sets of sensor electrodes illustrated in FIG. 5: first set 510; second set 520, and third set 530. All three sets of sensor electrodes are disposed in a single, common layer with one another on a single surface (or upon a layer that is disposed on that surface) of a substrate (e.g., on surface 103 of substrate 102). Processing system 110 (FIG. 1) can utilize similar techniques to those described in conjunction with FIG. 2B and sensor 108A for determining two-dimensional positional information of an input object relative to the sensor electrodes of sensor 108D.

In first set 510 (510-1, 510-2, . . . ) individual sensor electrodes (e.g., sensor electrode 510-1) are triangular in shape with a long axis elongated on and substantially parallel with first axis 201. With respect to sensor electrode 510-1, the width in the direction of second axis 202 varies in the direction of first axis 201 from a maximum on the left side of sensor 108D to a minimum on the right side (with left and right being relative to a direction along first axis 201). Sensor electrodes of first set 510 (e.g., 510-1 and 510-2) are substantially identical copies of one another that have been shifted by some distance on axis 202. Notches or indentations in the direction of axis 202 appear at regular intervals in the direction of axis 201 and alternate from being notched into the top and bottom edges of sensor electrodes of first set 510. A plurality of these notches exist on both the top edge and bottom edges of sensor electrodes of first set 510 and exist for at least a portion of the length of sensor electrodes of the first set 510 in the direction of axis 201. The notches continually decrease in depth from left to right along axis 201 until they disappear entirely. The notches are configured to receive rectangular segments which protrude perpendicular or oblique to a long axis of sensor electrodes of the third set.

As with the rectangular protruding segments illustrated in sensor 108C of FIG. 4, rectangular segments 532 of sensor 108D are used to increase and/or manipulate the transcapacitive coupling between transmitter and receiver sensor electrodes. Thus where rectangular segments 532 are closer to or disposed within a slot of an adjacent sensor electrode, the transcapacitive coupling will be stronger and where rectangular segments are further away from or protrude less into a slot of an adjacent sensor electrode, the transcapacitive coupling will be weaker. Also, it should be appreciated that even though some rectangular segments 532 that are depicted in FIG. 5 do not extend equally from each side of the sensor electrodes 530 this is not a requirement. For example, in some embodiments, rectangular segments 532 may extend equally from either side of sensor electrode 530. Also, even though the rectangular segments are shown as being even spaced throughout, they spacing of the segments may vary, such as in the manner depicted in sensor 108C of FIG. 4.

With reference to sensor electrode 510-1, notch 511-1 is in the upper edge of sensor electrode 510-1 and has the greatest depth of any notch in sensor electrode 510-1. Notch 511-2 is in the bottom edge of sensor electrode 510-1 and is the second greatest in depth. As can be seen, segment 532-1 of sensor electrode 530-1 is disposed inside of notch 511-2.

In second set 520 (520-1, 520-2, . . . ) individual sensor electrodes (e.g., sensor electrode 520-1) are triangular in shape with a long axis elongated on and substantially parallel with first axis 201. As can be seen, sensor electrodes (e.g., 520-1) of second set 520 are rotated mirror symmetric versions, or copies, of the sensor electrodes of first set 510. For example, sensor electrode 520-1 is a mirror symmetric (with respect to first axis 201) and 180 degree rotated version of sensor electrode 510-1. Due to being rotated mirror symmetric copies of the sensor electrodes of first set 510, the notches, such as notch 501 are greater in depth on the right side of sensor 108D and decrease in depth leftward across sensor electrodes of second set 520. Sensor electrodes of second set 520 (e.g., 520-1 and 520-2) are substantially identical copies of one another that have been shifted by some distance on axis 202.

In third set 530 (530-1, 530-2, 530-3 . . . ) individual sensor electrodes (e.g., sensor electrode 530-1) are rectangular in shape with a long axis elongated along and substantially parallel with first axis 201. In third set 530 individual sensor electrodes (e.g., sensor electrode 530-1) have a substantially rectangular shaped body (e.g., body 531 of sensor electrode 530) with a plurality of rectangular segments 532 (e.g., 532-1, 532-2, and the like) protruding perpendicular to a long side of the rectangular body. The distance between adjacent segments of the plurality of rectangular segments is regular along first axis 201, however protrusion varies. With respect to sensor electrode 510-1, segment 532-1 protrudes upward more than any other segment. Upward protrusion of segments progressively decreases as downward protrusion of segments progressively increases left to right across sensor electrode 530-1 with maximum downward protrusion exhibited by segment 532-1. In other embodiments, the rectangular segments can extend equal distances perpendicularly from either side of a sensor electrode 530. As can be seen, alternating sensor electrodes (e.g., 530-1, 530-3) of third set 530 are repeated copies of one another. While adjacent sensor electrodes (e.g., 530-1 and 530-2) are rotated mirror symmetric versions. For example, sensor electrode 530-2 is a mirror symmetric (with respect to first axis 201) and 180 degree rotated version of sensor electrode 530-1. At least one segment, but not all segments, of a sensor electrode of third set 530 are interleaved with protruding segments of an adjacent sensor electrode of third set 530. For example, segment 532-3 of sensor electrode 530-2 is interleaved with protruding segments of sensor electrode 530-1.

In one embodiment, when sensor 108D is in operation, processing system 110 can create a first transcapacitive coupling between one or more sensor electrodes of first set 510 and one or more sensor electrodes of third set 530 by transmitting a first electrical signal to be emitted by one or more of the sensor electrodes of first set 510. Processing system 110 can acquire a capacitive measurement of the first transcapacitive coupling by receiving the emitted first electrical signal with a sensor electrode of third set 530. Similarly, via such acquisition, processing system 110 can measure changes in this first transcapacitive coupling ($\Delta C_{t1}$) that are caused by presence of an input object, such as input object 120, relative to transmitting and receiving sensor electrodes. This first transcapacitive coupling varies substantially along first axis 201. With reference to a transcapacitive coupling between sensor electrode 510-1 and sensor electrode 530-1, the transcapacitive coupling varies along axis 201 in accordance with variation in the distance that protruding segments of sensor electrode 530-1 protrude toward sensor electrode 510-1 and/or into notches of sensor electrode 510-1. Thus, with respect to FIG. 5 and a first transcapacitive coupling between sensor electrode 510-1 and sensor electrode 530-1, this first transcapacitive coupling is strongest on the left side and weakest on the right side of sensor 108D. As mentioned above, rectangular segments 532 can be used to increase the transcapacitive coupling between transmitter and receiver sensor electrodes or to control the transcapacitive coupling. For example, in one embodiment, rectangular segments 532 can increase the amount in which the capacitive coupling varies from side-to-side (along axis 201) relative to sensor 108D. Similarly, in one embodiment, rectangular segments 532 can be utilized to decrease the amount in which the capacitive coupling varies from side-to-side (in direction 201) relative to sensor 108D. In some embodiments, rectangular segments 532 can also be employed to correct sensing irregularities that may exist in an arrangement of sensor electrodes.

It is appreciated that in one embodiment, processing system 110 can similarly acquire a capacitive measurement of the first transcapacitive coupling by emitting the first electrical signal with at least one sensor electrode of third set 530 (e.g., emitting with sensor electrode 530-1) and receiving the first electrical signal with at least one sensor electrode of first set 510 (e.g., receiving with sensor electrode 510-1).

In one embodiment, when sensor 108D is in operation, processing system 110 can create a second transcapacitive coupling between one or more sensor electrodes of second set 520 and one or more sensor electrodes of third set 530 by transmitting a second electrical signal to be emitted by one or more of the sensor electrodes of second set 520. Processing system 110 can acquire a measurement of the second transcapacitive coupling by receiving the emitted second electrical signal with a sensor electrode of third set 530. Similarly, via such acquisition, processing system 110 can measure changes in this second transcapacitive coupling ($\Delta C_{t2}$) that are caused by presence of an input object, such as input object 120, relative to transmitting and receiving sensor electrodes. This second transcapacitive coupling varies substantially along first axis 201. With reference to a transcapacitive coupling between sensor electrode 520-1 and sensor electrode 530-1, the transcapacitive coupling varies along axis 201 in accordance with variation in the distance that protruding segments of sensor electrode 530-1 protrude toward sensor electrode 520-1 and/or into notches of sensor electrode 520-1. Thus, with respect to FIG. 5 and a first transcapacitive coupling between sensor electrode 520-1 and sensor electrode 530-1, this first transcapacitive coupling is strongest on the right side and weakest on the left side of sensor 108D.

It is appreciated that in one embodiment, processing system 110 can similarly acquire a capacitive measurement of the second transcapacitive coupling by emitting the second electrical signal with at least one sensor electrode of third set 530 (e.g., emitting with sensor electrode 530-1) and receiving the second electrical signal with at least one sensor electrode of second set 520 (e.g., receiving with sensor electrode 520-1).

For purposes of example, and not of limitation, sensor electrodes of first set 510 and second set 520 are referred to herein as transmitters and sensor electrodes of third set 530 are referred to herein as receivers. However, it is appreciated that sensor electrodes of any set (510, 520, and 530) may be used for either or both of transmitting and receiving. Following this example, in one embodiment, sensor electrodes of the first set 510 and the second set 520 are coupled to processing system 110 via routing traces 104, while sensor electrodes of third set 530 are coupled to processing system 110 via routing traces 106. If routing traces are required to cross one another, such crossings may be made outside of the sensing region of sensor 108D, thus allowing the sensor electrodes of sensor 108D to be disposed in a single layer with one another even if multiple fabrication layers (outside of a sensing region) are needed for coupling routing traces to the sensor electrodes of sensor 108D.

As depicted in FIG. 5, sensor electrodes of first set 510 are commonly coupled to routing trace 104-1 and sensor electrodes of second set 520 are commonly coupled to routing trace 104-2. However, it is appreciated that in another embodiment, one or more sensor electrodes of first set 510 and/or of second set 520 may be individually coupled to a separate routing trace 104.

As depicted in FIG. 5, each sensor electrode of third set 530 is individually coupled to a separate routing trace 106. For example, sensor electrode 530-1 is coupled with routing trace 106-1, sensor electrode 530-2 is coupled with routing trace 106-2, and sensor electrode 530-3 is coupled with routing trace 106-3. It is appreciated that, in another embodiment, one or more sensor electrodes of third set 530 may be commonly coupled to a single routing trace 106.

It is appreciated that the embodiments depicted and described in conjunction with sensor 108D of FIG. 5 can be expanded in a similar manner to the manner in which sensor 108B of FIG. 3 expands the arrangement of sensor 108A of FIG. 2A.

Example Method of Capacitive Sensing in a Transcapacitive Sensor Device

The following discussion sets forth in detail the operation of example methods of operation of embodiments. With reference to FIGS. 6A and 6B flow diagram 600 illustrates example procedures used by various embodiments in methods of capacitive sensing in a transcapacitive sensor device. Flow diagram 600 includes some procedures that, in various embodiments, are carried out by a processor such as an ASIC under the control of computer-readable and computer-executable instructions. In this fashion, all or part of flow diagram 600 can be implemented using a computer or processing system, such as processing system 110, in various embodiments. The computer-readable and computer-executable instructions can reside in any tangible computer readable storage media, such as, for example, memory and/or logic of or coupled with processing system 110. These computer-readable and computer-executable instructions, are used to control or operate in conjunction with, for example, some portion of processing system 110, such as a processor or ASIC. Although specific procedures are disclosed in flow diagram 600, such procedures are examples. That is, embodiments are well suited to performing various other procedures or variations of the procedures recited in flow diagram 600 and described below. Likewise, in some embodiments, the procedures in flow diagram 600 (along with those described below) may be performed in an order different than presented and/or not all of the procedures described in flow diagram 600 may be performed.

Flow diagram 600 describes a method of using transcapacitive sensor device that comprises a first set of transmitter sensor electrodes, a second set of transmitter sensor electrodes, and a set of receiver sensor electrodes that are disposed in a single common layer on a substrate and are disposed with their long sides substantially in parallel with a first axis. For example, according to various embodiments, flow diagram 600 provides an example description of use of transcapacitive sensor device 100 and processing system 110 with one or more of the transcapacitive sensors 108 (108A-108D and their equivalents) that are described herein. Procedures of flow diagram 600 are described below, with reference to elements of FIGS. 1-5.

At 610 of flow diagram 600, in one embodiment, a first transcapacitive measurement is acquired by emitting a first electrical signal with a first set of transmitter sensor electrodes and receiving the first electrical signal with at least one receiver sensor electrode of a set of receiver sensor electrodes. The first set of transmitter sensor electrodes and the set of receiver sensor electrodes are configured for providing a first capacitive coupling therebetween that varies substantially along a first axis. In one embodiment, this can comprise processing system 110 transmitting the first electric signal for emission by a transmitter sensor electrode and then receiving that electrical signal with a receiver sensor electrode. With reference to FIG. 2A, in one embodiment, this can comprise emitting with sensor electrode 210-1 and receiving with sensor electrode 230-1 and/or receiving in a time scanned fashion with a plurality of different sensor electrodes 230 (e.g., 230-1, then 230-2, then 230-3). With reference to FIG. 3, this can comprise emitting with sensor electrode 210-1 and receiving with sensor electrode 330-1 and/or receiving in a time scanned fashion with a plurality of different sensor electrodes 330 (e.g., 330-1, then 330-2, then 330-3). With reference to FIG. 4, in one embodiment, this can comprise emitting with sensor electrode 410-1 and receiving with sensor electrode 430-1 and/or receiving in a time scanned fashion with a plurality of different sensor electrodes 430 (e.g., 430-1, then 430-2, then 430-3). With reference to FIG. 5, in one embodiment, this can comprise emitting with sensor electrode 510-1 and receiving with sensor electrode 530-1 and/or receiving in a time scanned fashion with a plurality of different sensor electrodes 530 (e.g., 530-1, then 530-2, then 530-3). Processing system 110 can acquire additional capacitive measurements by transmitting on other selected transmitter sensor electrodes of the first set of transmitter sensor electrodes and receiving with one or more selected receiver sensor electrodes.

At 620 of flow diagram 600, in one embodiment, a second transcapacitive measurement is acquired by emitting a second electrical signal with a second set of transmitter sensor electrodes and receiving the second electrical signal with the at least one receiver sensor electrode of the set of receiver sensor electrodes. The second set of transmitter sensor electrodes and the set of receiver sensor electrodes are configured for providing a second capacitive coupling therebetween that varies substantially inversely to the first capacitive coupling along the first axis. In one embodiment, this can comprise processing system 110 transmitting the second electric signal for emission by a transmitter sensor electrode and then receiving that electrical signal with a receiver sensor electrode. With reference to FIG. 2A, in one embodiment, this can comprise emitting with sensor electrode 220-1 and receiving with sensor electrode 230-1 and/or receiving in a time scanned fashion with a plurality of different sensor electrodes 230 (e.g., 230-1, then 230-2, then 230-3). With reference to FIG. 3, in one embodiment, this can comprise emitting with sensor electrode 220-1 and receiving with sensor electrode 330-1 and/or receiving in a time scanned fashion with a plurality of different sensor electrodes 330 (e.g., 330-1, then 330-2, then 330-3). With reference to FIG. 4, in one embodiment, this can comprise emitting with sensor electrode 420-1 and receiving with sensor electrode 430-1 and/or receiving in a time scanned fashion with a plurality of different sensor electrodes 430 (e.g., 430-1, then 430-2, then 430-3). With reference to FIG. 5, this can comprise emitting with sensor electrode 520-1 and receiving with sensor electrode 530-1 and/or receiving in a time scanned fashion with a plurality of different sensor electrodes 530 (e.g., 530-1, then 530-2, then 530-3). Processing system 110 can acquire additional capacitive measurements by transmitting on other selected transmitter sensor electrodes of the second set of transmitter sensor electrodes and receiving with one or more selected receiver sensor electrodes.

At 630 of flow diagram 600, in one embodiment, positional information is determined related to an external input object. The positional information is determined based on the first transcapacitive measurement and the second transcapacitive measurement, wherein the positional information comprises at least a position of the input object along the first axis. In one embodiment, this comprises processing system 110 determining the positional information of an external input object, such as input object 120, when the input object is interacting with the sensing region of sensor 108. For example, by measuring the change in transcapacitive couplings (from a baseline) caused by the input object in the first measurement and in the second measurement, processing system 110 can determine a position along axis 201 (see FIGS. 2A-5) with respect to a sensor 108. Similarly, by isolating a capacitive coupling between a transmitter/receiver sensor electrode pair that is most affected by the interacting of the input object, processing system 110 can determine a position along axis 202 with respect to sensor 108. Attention is directed to the previous discussion of the determination of positional information along axis 201 of an input object (see FIG. 2B and related discussion) for further examples of the position determining calculations that may be performed by processing system 110.

At 640, in one embodiment, the method of flow diagram 600 further comprises acquiring a third transcapacitive measurement by emitting a third electrical signal with a third set of transmitter sensor electrodes and receiving the third electrical signal with at least one receiver sensor electrode of the set of receiver sensor electrodes. The third set of transmitter sensor electrodes is disposed on the first surface in the single layer at a laterally shifted location along the first axis from the first set of transmitter sensor electrodes and comprises a mirror symmetric copy of the first set of transmitter sensor electrodes. FIG. 3, shows sensor 108B with such a mirror symmetric copy of a first set of sensor electrodes from sensor 108A, and demonstrates how the electrode patterns of sensors 108C and 108D could be similarly enlarged. In one embodiment, this can comprise processing system 110 transmitting the third electric signal for emission by a transmitter sensor electrode of a third set and then receiving that electrical signal with a receiver sensor electrode. With reference to FIG. 3, in one embodiment, this can comprise emitting with sensor electrode 310-1 and receiving with sensor electrode 330-1 and/or receiving in a time scanned fashion with a plurality of different sensor electrodes 330 (e.g., 330-1, then 330-2, then 330-3). Processing system 110 can acquire additional capacitive measurements by transmitting on other selected transmitter sensor electrodes of the third set of transmitter sensor electrodes and receiving with one or more selected receiver sensor electrodes.

At 650, in one embodiment, the method of flow diagram 600 further comprises acquiring a fourth transcapacitive measurement by emitting a fourth electrical signal with a fourth set of transmitter sensor electrodes and receiving the fourth electrical signal with at least one receiver sensor electrode of the set of receiver sensor electrodes. The fourth set of transmitter sensor electrodes is disposed on the first surface in the single layer at a laterally shifted location along the first axis from the second set of transmitter sensor electrodes and comprises a mirror symmetric copy of the second set of transmitter sensor electrodes. FIG. 3, shows sensor 108B with such a mirror symmetric copy of a second set of sensor electrodes from sensor 108A, and demonstrates how the electrode patterns of sensors 108C and 108D could be similarly enlarged. In one embodiment, this can comprise processing system 110 transmitting the fourth electric signal for emission by a transmitter sensor electrode of a fourth set and then receiving that electrical signal with a receiver sensor electrode. With reference to FIG. 3, in one embodiment, this can comprise emitting with sensor electrode 320-1 and receiving with sensor electrode 330-1 and/or receiving in a time scanned fashion with a plurality of different sensor electrodes 330 (e.g., 330-1, then 330-2, then 330-3). Processing system 110 can acquire additional capacitive measurements by transmitting on other selected transmitter sensor electrodes of the fourth set of transmitter sensor electrodes and receiving with one or more selected receiver sensor electrodes.

It is appreciated that these additional measurements can be further employed to refine a position determination of an input object. Attention is directed to the previous discussion of the determination of the position of an input object along first axis 201 and second axis 202 (see FIG. 2B and related discussion) for further example of the position determining calculations that may be performed by processing system 110.

Example Methods of Creation

Figure 7B:
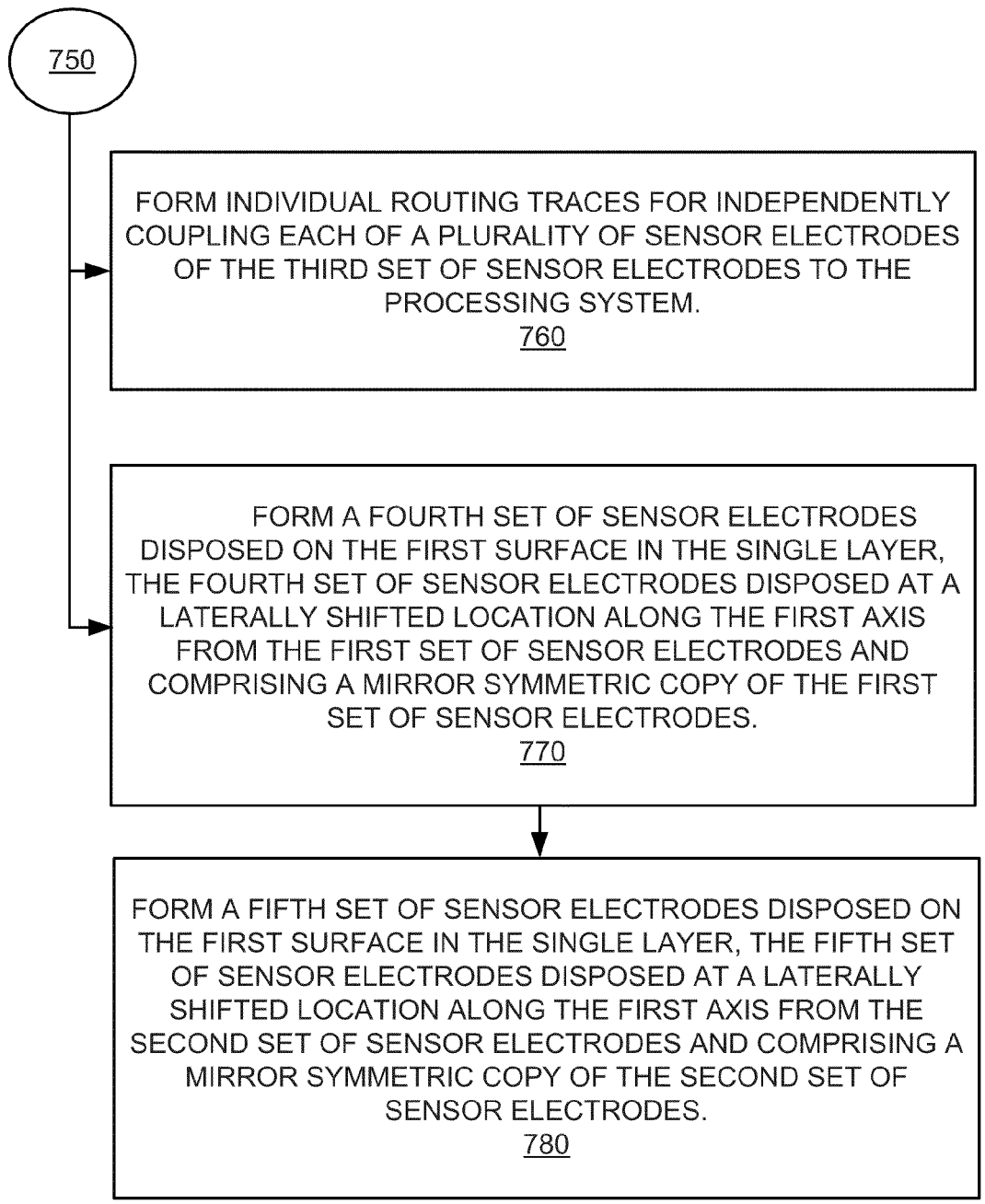

FIGS. 7A and 7B illustrate a flow diagram 700 of some example methods of creating a transcapacitive sensor, according to various embodiments. Flow diagram 700 describes a method of creating one or more sensors 108 (e.g., 108A-108D) which can be utilized with a transcapacitive sensor device (such as device 100) and with a processing system (such as processing system 110), according to one or more embodiments described herein. Procedures of flow diagram 700 are described below, with reference to elements of FIGS. 1-5. Although an order of events is shown in FIGS. 7A and 7B, this ordering is shown by way of example and not of limitation. Thus, a specific ordering of events is not to be implied or inferred. Instead, in various embodiments, it should be understood that one or more of the described events of FIGS. 7A and 7B may occur in a different order, may happen simultaneously or may not occur.

At 710 of flow diagram 700, in one embodiment, a first set of sensor electrodes is formed on a first surface of a sensor substrate. The forming can be conducted in accordance with conventional manufacturing techniques for forming sensor electrodes. The individual sensor electrodes of the first set of sensor electrodes are formed such that they are substantially parallel to a first axis and such that the individual sensor electrodes of the first set of sensor electrodes are substantially identical to one another. With reference to FIGS. 2A-5, sensor electrodes 210, 410, and 510 and their equivalents provide examples of the results of such forming of a first set of sensor electrodes that are parallel to a first axis, axis 201.

In one embodiment, the first set of sensor electrodes is formed such that a sensor electrode of the first set of sensor electrodes has a varying width perpendicular to the first axis. The results of such forming are illustrated at least by sensor electrodes 210, 410, and 510 in FIGS. 2A-5.

In one embodiment, the first set of sensor electrodes is formed such that at least one sensor electrode of the first set is formed as a substantially rectangular shaped body with a plurality of rectangular segments protruding perpendicular to a long side of the body. These rectangular segments may be of differing or of substantially equal length protruding perpendicular to the long side of the body. Additionally, a distance along the first axis may vary or be constant between the segments. One embodiment of the results of such forming is illustrated by sensor electrodes 410 of FIG. 4.

At 720 of flow diagram 700, in one embodiment, a second set of sensor electrodes is formed on the first surface. The forming can utilize any of the materials and/or techniques described herein or that are conventional or known to those of skill in the art for disposing sensor electrodes on a substrate.

The second set of sensor electrodes is formed in a single layer with the first set of sensor electrodes. The second set of sensor electrodes is formed parallel to the first axis and comprises a rotated mirror symmetric version of the first set of sensor electrodes. With reference to FIGS. 2A-5, sensor electrodes 220, 420, and 520 and their equivalents provide examples of the results of such forming of a second set of sensor electrodes.

In one embodiment, the first and second sets of sensor electrodes are formed such that an individual sensor electrode of the second set is substantially rotationally mirror symmetric to an individual sensor electrode of the first set. The results of such forming are illustrated, for example, in FIG. 2A by sensor electrodes 220-1 and 220-2 being rotationally mirror symmetric to sensor electrode 210-1.

At 730 of flow diagram 700, in one embodiment, a third set of sensor electrodes is formed in the single layer on the first surface. The forming can utilize any of the materials and/or techniques described herein or conventional or known to those of skill in the art for disposing sensor electrodes on a substrate. The third set of sensor electrodes is formed such that at least one sensor electrode of the third set of sensor electrodes is disposed in an interleaved fashion between sensor electrodes of the first set of sensor electrodes and the second set of sensor electrodes. The third set of sensor electrodes are formed such that any sensor electrode of the third set of sensor electrodes comprises a rectangular shape with a long side aligned parallel to the first axis. With reference to FIGS. 2A-5, sensor electrodes 230, 330, and 530 and their equivalents provide examples of the results of such forming of a third set of sensor electrodes.

In one embodiment, the first set of sensor electrodes is formed such that individual sensor electrodes of the first set of sensor electrodes are substantially wedge shapes elongated along a first axis (e.g., axis 201), and are disposed on the first surface (e.g., surface 103) such that a varying gap exists along the first axis between each sensor electrode of the first set of sensor electrodes and each adjacent sensor electrode of the third set of sensor electrodes. The results of such forming are illustrated at least in FIGS. 2A, 2B, 3, and 5.

In one embodiment, the second set of sensor electrodes is formed such that individual sensor electrodes of the second set of sensor electrodes are substantially wedge shapes elongated along a first axis (e.g., axis 201), and are disposed on the first surface (e.g., surface 103) such that a varying gap exists along the first axis between each sensor electrode of the second set of sensor electrodes and each adjacent sensor electrode of the third set of sensor electrodes. The results of such forming are illustrated at least in FIGS. 2A, 2B, 3, and 5.

In one embodiment, the third set of sensor electrodes is formed such that at least one sensor electrode of third set is formed as a substantially rectangular shaped body with a plurality of rectangular segments protruding perpendicular to a long side of the body. These rectangular segments may be of differing or of substantially equal length protruding perpendicular to the long side of the body. Additionally, a distance along the first axis may vary or be constant between the segments. In one embodiment, at least one of the protruding segments is interleaved with similar protruding segments of at least a second sensor electrode of the third set of sensor electrodes. The results of such forming are illustrated at least by sensor electrodes 530-1 and 530-2 of FIG. 5 which display such interleaved perpendicular segments.

At 740 of flow diagram 700, in one embodiment, a first common routing trace is formed for coupling a plurality of the first set of sensor electrodes to a processing system. The forming can utilize any of the materials and/or techniques described herein or conventional or known to those of skill in the art for disposing a conductive routing trace on a substrate and coupling such a trace to a sensor electrode. With reference to FIGS. 1-5 conductive routing trace 104-1 illustrates a routing trace coupling the first set of sensor electrodes to processing system 110. For example, in FIGS. 2A, 2B, and 3 routing trace 104-1 is commonly coupled to sensor electrodes of set 210 to processing system 110; in FIG. 4 routing trace 104-1 is commonly coupled to sensor electrodes of set 410 to processing system 110; and in FIG. 5 routing trace 104-1 is commonly coupled to sensor electrodes of set 510 to processing system 110.

At 750 of flow diagram 700, in one embodiment, a second common routing trace is formed for coupling a plurality of the second set of sensor electrodes to the processing system. The forming can utilize any of the materials and/or techniques described herein or conventional or known to those of skill in the art for disposing a conductive routing trace on a substrate and coupling such a trace to a sensor electrode. With reference to FIGS. 1-5 conductive routing trace 104-2 illustrates a routing trace coupling the second set of sensor electrodes to processing system 110. For example, in FIGS. 2A, 2B, and 3 routing trace 104-2 is commonly coupled to sensor electrodes of set 220 to processing system 110; in FIG. 4 routing trace 104-2 is commonly coupled to sensor electrodes of set 420 to processing system 110; and in FIG. 5 routing trace 104-2 is commonly coupled to sensor electrodes of set 520 to processing system 110.

At 760, in one embodiment, the method of flow diagram 700 further comprises forming individual routing traces for independently coupling each of a plurality of sensor electrodes of the third set of sensor electrodes to the processing system. The forming can utilize any of the materials and/or techniques described herein or conventional or known to those of skill in the art for disposing a conductive routing trace on a substrate and coupling such a trace to a sensor electrode. With reference to FIGS. 1-5 conductive routing traces 106 illustrate routing traces that couple individual sensor electrodes of the third set of sensor electrodes to processing system 110. For example, in FIGS. 2A, 2B, and 3 routing trace 106-1 individually couples sensor electrodes 230-1 to processing system 110; in FIG. 4 routing trace 106-1 individually couples sensor electrode 430-1 to processing system 110; and in FIG. 5 routing trace 106-1 individually couples sensor electrode 530-1 to processing system 110.

At 770, in one embodiment, the method of flow diagram 700 further comprises forming a fourth set of sensor electrodes disposed on the first surface in the single layer. The forming can utilize any of the materials and/or techniques described herein or conventional or known to those of skill in the art for disposing sensor electrodes on a substrate. The fourth set of sensor electrodes is disposed at a laterally shifted location along the first axis from the first set of sensor electrodes and comprises a mirror symmetric copy of the first set of sensor electrodes. With reference to FIG. 3, sensor electrodes 310 and their equivalents provide an example of the results of such forming of a fourth set of sensor electrodes.

At 780, in one embodiment, the method of flow diagram 700 further comprises forming a fifth set of sensor electrodes disposed on the first surface in the single layer. The forming can utilize any of the materials and/or techniques described herein or conventional or known to those of skill in the art for disposing sensor electrodes on a substrate. The fifth set of sensor electrodes is disposed at a laterally shifted location along the first axis from the second set of sensor electrodes and comprises a mirror symmetric copy of the second set of sensor electrodes. With reference to FIG. 3, sensor electrodes 320 and their equivalents provide an example of the results of such forming of a fifth set of sensor electrodes.

In one embodiment, the method as described by 770 and 780 of flow diagram 700 further comprises forming a sixth set of sensor electrodes disposed on the first surface in the single layer. The forming can utilize any of the materials and/or techniques described herein or conventional or known to those of skill in the art for disposing sensor electrodes on a substrate. The sixth set of sensor electrodes is disposed at a laterally shifted location along the first axis from the third set of sensor electrodes and comprises a copy of the third set of sensor electrodes. Reference is made to the description of sensor electrodes 330 of FIG. 3 and an embodiment that can include splitting these electrodes to create two sets of identical sensor electrodes that are laterally along axis 201 from one another.

The foregoing descriptions of specific embodiments have been presented for purposes of illustration and description. They are not intended to be exhaustive or to limit the presented technology to the precise forms disclosed, and obviously many modifications and variations are possible in light of the above teaching. The embodiments were chosen and described in order to best explain the principles of the presented technology and its practical application, to thereby enable others skilled in the art to best utilize the presented technology and various embodiments with various modifications as are suited to the particular use contemplated.

What is claimed is:

1. A transcapacitive sensor device comprising:
   a sensor substrate;
   a first set of sensor electrodes disposed on a first surface of said sensor substrate, wherein individual sensor electrodes of said first set of sensor electrodes are substantially parallel to a first axis, and wherein said individual sensor electrodes of said first set of sensor electrodes are substantially identical to one another;
   a second set of sensor electrodes disposed on said first surface of said sensor substrate, said second set of sensor electrodes comprising a rotated mirror symmetric version of said first set of sensor electrodes, said second set of sensor electrodes disposed parallel to said first axis;
   a third set of sensor electrodes disposed on said first surface of said sensor substrate between sensor electrodes of said first set and said second set of sensor electrodes, wherein at least one sensor electrode of said third set of sensor electrodes comprises a rectangular shape with a long side aligned parallel to said first axis,
   wherein said first set and said third set of sensor electrodes are configured for providing a first capacitive coupling therebetween that varies substantially along said first axis, wherein said second set and said third set of sensor electrodes are configured for providing a second capacitive coupling therebetween that varies substantially inversely to said first capacitive coupling along said first axis, and wherein said first set, second set and third set of sensor electrodes are all disposed in a single layer; and
   a processing system coupled to said first set of sensor electrodes, said second set of sensor electrodes, and said third set of sensor electrodes, wherein said processing system is configured for:
      acquiring a first capacitive measurement by emitting a first electrical signal with at least one sensor electrode of said first set of sensor electrodes and receiving said first electrical signal with at least one sensor electrode of said third set of sensor electrodes;
      acquiring a second capacitive measurement by emitting a second electrical signal with said second set of sensor electrodes and receiving said second electrical signal with said at least one sensor electrode of said third set of sensor electrodes; and
      determining positional information related to an external input object based on said first capacitive measurement and said second capacitive measurement, wherein said positional information comprises at least a position of said input object along said first axis.

2. The transcapacitive sensor device of claim 1, further comprising:
   a fourth set of sensor electrodes disposed on said first surface in said single layer, said fourth set of sensor electrodes disposed at a laterally shifted location along said first axis from said first set of sensor electrodes and comprising a mirror symmetric copy of said first set of sensor electrodes; and
   a fifth set of sensor electrodes disposed on said first surface in said single layer, said fifth set of sensor electrodes disposed at a laterally shifted location along said first axis from said second set of sensor electrodes and comprising a mirror symmetric copy of said second set of sensor electrodes.

3. The transcapacitive sensor device of claim 1, further comprising:
   a first common routing trace coupling a plurality of said first set of sensor electrodes to said processing system;
   a second common routing trace coupling a plurality of said second set of sensor electrodes to said processing system; and
   individual routing traces for independently coupling each of a plurality of sensor electrodes of said third set of sensor electrodes to said processing system.

4. The transcapacitive sensor device of claim 1, wherein at least one sensor electrode of said first set of sensor electrodes has a varying width perpendicular to said first axis.

5. The transcapacitive sensor device of claim 1, wherein at least one sensor electrode of said first set of sensor electrodes comprises a substantially rectangular shaped body with a plurality of rectangular segments of substantially equal length protruding perpendicular to a long side of said body, where a distance between rectangular segments of said plurality of rectangular segments along said first axis varies between said rectangular segments.

6. The transcapacitive sensor device of claim 1, wherein at least one sensor electrode of said first set of sensor electrodes comprises a substantially rectangular shaped body with a plurality of rectangular segments of varying length protruding perpendicular to a long side of said body.

7. The transcapacitive sensor device of claim 1, wherein at least one sensor electrode of said third set of sensor electrodes comprises a plurality of rectangular segments protruding perpendicular to said long side, and wherein at least one of said segments is interleaved with similar segments of at least a second sensor electrode of said third set of sensor electrodes.

8. A method of capacitive sensing in a transcapacitive sensor device, wherein said transcapacitive sensor device comprises a first set of transmitter sensor electrodes, a second set of transmitter sensor electrodes, and a set of receiver sensor electrodes, said method comprising:
   acquiring a first transcapacitive measurement by emitting a first electrical signal with said first set of transmitter sensor electrodes and receiving said first electrical signal with at least one receiver sensor electrode of said set of receiver sensor electrodes, wherein said first set of transmitter sensor electrodes and said set of receiver sensor electrodes are configured for providing a first capacitive coupling therebetween that varies substantially along a first axis;

acquiring a second transcapacitive measurement by emitting a second electrical signal with said second set of transmitter sensor electrodes and receiving said second electrical signal with said at least one receiver sensor electrode of said set of receiver sensor electrodes, wherein said second set of transmitter sensor electrodes and said set of receiver sensor electrodes are configured for providing a second capacitive coupling therebetween that varies substantially inversely to said first capacitive coupling along said first axis, and wherein said first set of transmitter sensor electrodes, said second set of transmitter sensor electrodes, and said set of receiver sensor electrodes are all disposed in a single layer on a first surface of a sensor substrate; and determining positional information related to an external input object based on said first transcapacitive measurement and said second transcapacitive measurement, wherein said positional information comprises at least a position of said input object along said first axis.

9. The method as recited in claim 8 further comprising:
acquiring a third transcapacitive measurement by emitting a third electrical signal with a third set of transmitter sensor electrodes and receiving said third electrical signal with at least one receiver sensor electrode of said set of receiver sensor electrodes, wherein said third set of transmitter sensor electrodes is disposed on said first surface in said single layer at a laterally shifted location along said first axis from said first set of transmitter sensor electrodes, and wherein said third set of transmitter sensor electrodes comprises a mirror symmetric copy of said first set of transmitter sensor electrodes; and acquiring a fourth transcapacitive measurement by emitting a fourth electrical signal with a fourth set of transmitter sensor electrodes and receiving said fourth electrical signal with at least one receiver sensor electrode of said set of receiver sensor electrodes, wherein said fourth set of transmitter sensor electrodes is disposed on said first surface in said single layer at a laterally shifted location along said first axis from said second set of transmitter sensor electrodes, and wherein said fourth set of transmitter sensor electrodes comprises a mirror symmetric copy of said second set of transmitter sensor electrodes.

10. The method as recited in claim 8 herein said acquiring a first transcapacitive measurement by emitting a first electrical signal with said first set of transmitter sensor electrodes and receiving said first electrical signal with at least one receiver sensor electrode of said set of receiver sensor electrodes comprises:

emitting said first electrical signal with said first set of transmitter sensor electrodes and receiving said first electrical signal in a time scanned fashion with at least two different receiver sensor electrodes of said set of receiver sensor electrodes; and wherein said acquiring a second transcapacitive measurement by emitting a second electrical signal with said second set of transmitter sensor electrodes and receiving said second electrical signal with said at least one receiver sensor electrode of said set of receiver sensor electrodes comprises:

emitting said second electrical signal with said second set of transmitter sensor electrodes and receiving said second electrical signal in a time scanned fashion with at least two different receiver sensor electrodes of said set of receiver sensor electrodes.

11. A transcapacitive sensor device comprising:
a sensor substrate;
a first set of sensor electrodes disposed on a first surface of said sensor substrate, wherein individual sensor electrodes of said first set of sensor electrodes are substantially parallel to a first axis, and wherein said individual sensor electrodes of said first set of sensor electrodes are substantially identical to one another;
a second set of sensor electrodes disposed on said first surface of said sensor substrate, said second set of sensor electrodes comprising a rotated mirror symmetric version of said first set of sensor electrodes, said second set of sensor electrodes disposed parallel to said first axis;
a third set of sensor electrodes disposed on said first surface of said sensor substrate between sensor electrodes of said first set and said second set of sensor electrodes, wherein at least one sensor electrode of said third set of sensor electrodes comprises a rectangular shape with a long side aligned parallel to said first axis,
wherein said first set and said third set of sensor electrodes are configured for providing a first capacitive coupling therebetween that varies substantially along said first axis, wherein said second set and said third set of sensor electrodes are configured for providing a second capacitive coupling therebetween that varies substantially inversely to said first capacitive coupling along said first axis, and wherein said first set, second set and third set of sensor electrodes are all disposed in a single layer; and
a processing system coupled to said first set of sensor electrodes, said second set of sensor electrodes, and said third set of sensor electrodes, wherein said processing system is configured for:

acquiring a first capacitive measurement by emitting a first electrical signal with at least one sensor electrode of said third set of sensor electrodes and receiving said first electrical signal with at least one sensor electrode of said first set of sensor electrodes;

acquiring a second capacitive measurement by emitting a second electrical signal with said at least one sensor electrode of said third set of sensor electrodes and receiving said second electrical signal with at least one sensor electrode of said second set of sensor electrodes; and determining positional information related to an external input object based on said first capacitive measurement and said second capacitive measurement, wherein said positional information comprises at least a position of said input object along said first axis.

12. The transcapacitive sensor device of claim 11, further comprising:
a fourth set of sensor electrodes disposed on said first surface in said single layer, said fourth set of sensor electrodes disposed at a laterally shifted location along said first axis from said first set of sensor electrodes and comprising a mirror symmetric copy of said first set of sensor electrodes; and
a fifth set of sensor electrodes disposed on said first surface in said single layer, said fifth set of sensor electrodes disposed at a laterally shifted location along said first axis from said second set of sensor electrodes and comprising a mirror symmetric copy of said second set of sensor electrodes.

13. The transcapacitive sensor device of claim 11, wherein at least one sensor electrode of said first set of sensor electrodes has a varying width perpendicular to said first axis.

14. The transcapacitive sensor device of claim 11, wherein at least one sensor electrode of said first set of sensor electrodes comprises a substantially rectangular shaped body with a plurality of rectangular segments of substantially equal length protruding perpendicular to a long side of said body, where a distance between rectangular segments of said plurality of rectangular segments along said first axis varies between said rectangular segments.

15. The transcapacitive sensor device of claim 11, wherein at least one sensor electrode of said first set of sensor electrodes comprises a substantially rectangular shaped body with a plurality of rectangular segments of varying length protruding perpendicular to a long side of said body.

16. The transcapacitive sensor device of claim 11, wherein at least one sensor electrode of said third set of sensor electrodes comprises a plurality of rectangular segments protruding perpendicular to said long side, and wherein at least one of said segments is interleaved with similar segments of at least a second sensor electrode of said third set of sensor electrodes.

\* \* \* \* \*